US006852032B2

(12) United States Patent
Ishino

(10) Patent No.: US 6,852,032 B2
(45) Date of Patent: Feb. 8, 2005

(54) GAME MACHINE, METHOD OF PERFORMING GAME AND COMPUTER-READABLE MEDIUM

(75) Inventor: Yukinobu Ishino, Tokyo (JP)

(73) Assignees: Nikon Corporation, Tokyo (JP); Nikon Technologies, Inc., Tokyo (JP)

( * ) Notice: Subject to any disclaimer, the term of this patent is extended or adjusted under 35 U.S.C. 154(b) by 352 days.

(21) Appl. No.: 09/998,411

(22) Filed: Dec. 3, 2001

(65) Prior Publication Data

US 2002/0107069 A1 Aug. 8, 2002

(30) Foreign Application Priority Data

Dec. 6, 2000 (JP) ........................................ 2000-371019

(51) Int. Cl.[7] .............................. A63F 13/00; A63F 9/24; G06F 17/00; G06F 19/00
(52) U.S. Cl. ...................................................... 463/30
(58) Field of Search ................................ 463/1, 16–44, 463/2, 5, 32; 395/152, 173–175, 127; 345/118–122

(56) References Cited

U.S. PATENT DOCUMENTS

| | | | | |
|---|---|---|---|---|
| 4,545,583 A | * | 10/1985 | Pearman et al. ................ | 463/5 |
| 5,366,229 A | | 11/1994 | Suzuki | |
| 5,734,807 A | * | 3/1998 | Sumi .......................... | 345/427 |
| 5,853,324 A | * | 12/1998 | Kami et al. .................... | 463/2 |
| 6,007,429 A | * | 12/1999 | Lubniewski .................. | 463/50 |
| 6,012,980 A | * | 1/2000 | Yoshida et al. ................ | 463/2 |
| 6,206,783 B1 | * | 3/2001 | Yamamoto et al. ........... | 463/36 |

FOREIGN PATENT DOCUMENTS

| | | |
|---|---|---|
| EP | 0 809 214 A1 | 11/1997 |
| EP | 0 952 555 A1 | 10/1999 |
| JP | A 6-213595 | 8/1994 |
| JP | A 7-136343 | 5/1995 |
| JP | A 8-71252 | 3/1996 |
| JP | A 8-117440 | 5/1996 |

* cited by examiner

*Primary Examiner*—Teresa Walberg
*Assistant Examiner*—Robert Mendoza
(74) *Attorney, Agent, or Firm*—Oliff & Berridge, PLC

(57) ABSTRACT

A game machine displays a target on a display plane with four known points. An image sensor with an image plane on which an image of the display plane is formed with the known points included. The game machine calculates an attitude of the image plane relative to the display plane in response to the image of the known points on the image plane. The game machine causes a change in the target depending on the calculated attitude. The game machine calculates the position of a point on the display plane corresponding to a predetermined position on the image plane in response to the image of the known points on the image plane. The game machine compares the position of the target point with the calculated position to cause a change in the image of the target point on the display plane in response to the comparison.

30 Claims, 17 Drawing Sheets

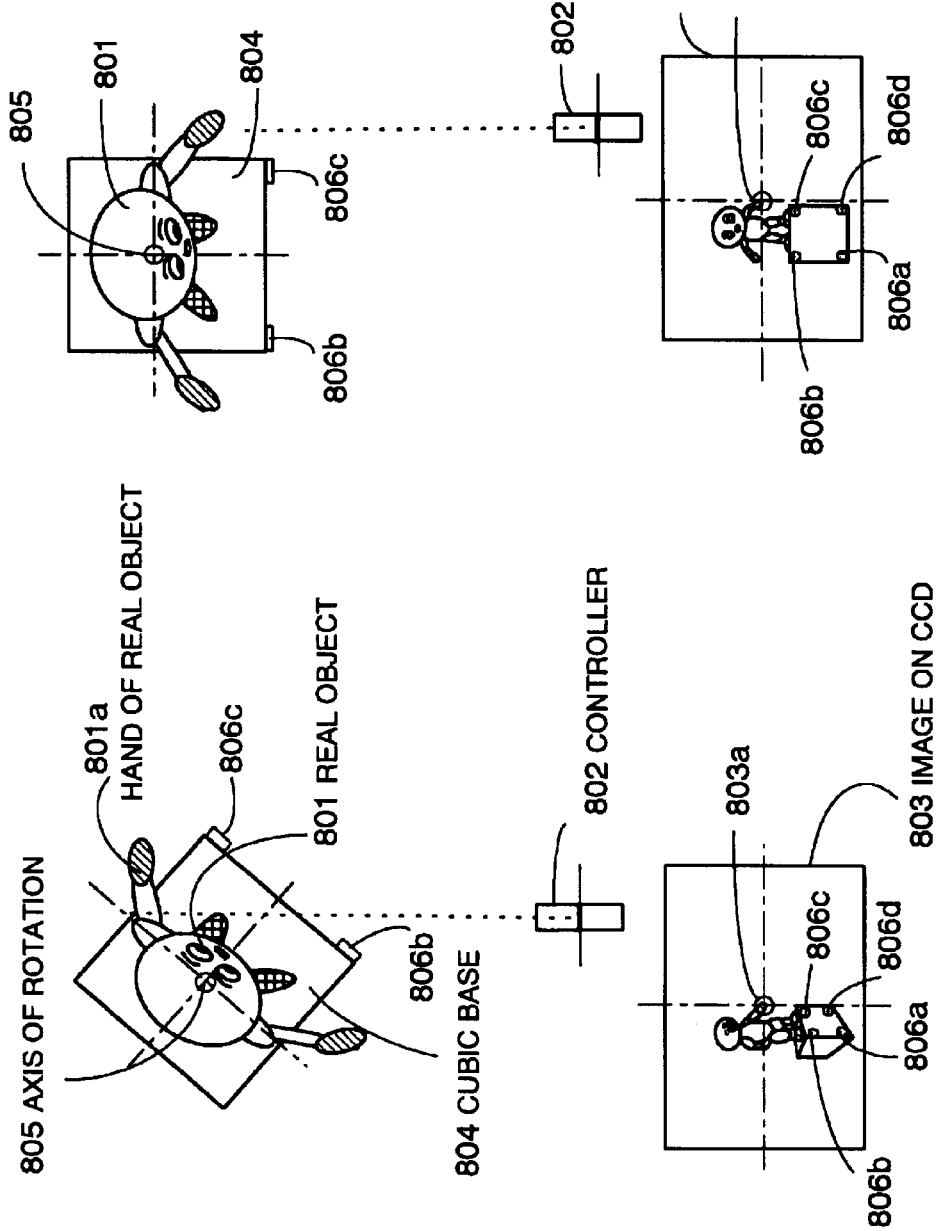

GAME MACHINE, METHOD OF PERFORMING GAME AND COMPUTER-READABLE MEDIUM

BACKGROUND OF THE INVENTION

This application is based upon and claims priority of Japanese Patent Application No. 2000-371019 filed on Dec. 6, 2000, the contents being incorporated herein by reference.

1. Field of the Invention

The present invention relates to a game machine, method of performing a game and a computer-readable medium.

2. Description of Related Art

In their field art, various types of shooting game or driving simulation games have been proposed. Especially, shooting games become very popular.

In a shooting game machine with a CRT display, a controller of a gun type with a very narrow light receiving angle is widely used.

Examples of above game machine are disclosed in Japanese Patent Publication Nos. Sho 60-179079 and Hei 4-51987.

Another type of example of the shooting game is disclosed in Japanese Patent Publication Nos. Sho 62-32987 and Hei 5-322487.

In this type shooting game machine, the displaying operation of CRT in the projector and photographing operation of a video camera for detecting the shot point have to be perfectly synchronized.

Recently, with the progress of image processor, 3-Dimensinal shooting game by Computer Graphics is widely used.

Japanese Patent Publication Nos. Sho 6-213595, Hei 11-86038 and WO97/21194 disclose the examples of such 3-Dimentional shooting game on Computer Graphics.

In the conventional type game machines, however, various insufficiencies are left. For example, there has been a limitation to the position and the attitude of a player to result in a monotony of the game.

SUMMARY OF THE INVENTION

In order to overcome the problems and disadvantages, the invention provides a game machine to perform a game with a controller of a target, the target including at least four known points defining a plane, and an image sensor having an image plane on which an image of the known points of the target are formed. The game machine according to the invention further comprises a processor for calculating an attitude of the image plane relative to the plane defined by the known points of the target on the basis of the output of the image sensor including the information of the positions of the image of the known points on the image plane. The game machine according to the invention still further comprises a signal generator that generates a signal to be transmitted to the controller to cause a change in the target depending on the attitude calculated by the processor.

According to the invention above, a player with the image sensor in his or her hand will experience an exiting change in the target depending on the calculated attitude of the image plane of the image sensor relative to the plane defined by the known points of the target.

The target may be a real object or an image thereof displayed on a display plane. In the latter case, the image display may include an image projector for projecting the image of the target on a screen. Further, the image on the display plane may be of a virtual reality space in place of the target. In the case that the image of the target or the virtual reality space is displayed on the display plane, the above mentioned at least four known points may be given on the display plane independently from such a target or a virtual reality space. In other words, the known points do not necessarily belong to the target or the virtual reality space as long as the image of the known points are formed on the image plane of the image sensor.

According to another feature of the invention, the game machine further comprises a range finder for measuring the distance from the image sensor to the display plane, wherein the controller causes the change in the image on the display further depending on the range finder. This may increase a reality of the game.

According to further feature of the invention, the processor further calculates the position of a point on the display plane, the image of which is formed at a predetermined position on the image plane, on the basis of the attitude and the output of the image sensor including the information of the positions of the known points. Thus, the signal generator generates the signal further depending on the position calculated by the processor. This may cause a partial change in the target such as an object shot in its specific portion identified by the calculated position.

The invention further provides a game machine to perform a game with an image display for displaying an image of a target point on a display plane with at least four known points and an image sensor having an image plane on which an image of the display plane is formed with the known points included in the image. The game machine according to the invention further comprises a processor for calculating the position of a point on the display plane, the image of which is formed at a predetermined position on the image plane, on the basis of the output of the image sensor including the information of the positions of the known points. The game machine according to the invention still further comprises a comparator that compares the position of the target point with the position calculated by the processor for generating a signal to be transmitted to the image display to cause a change in the image of the target point on the display plane in response to the comparator.

According to the invention above, a player with the image sensor in his or her hand will experience an exiting shooting game in which the change in the target is caused when the comparator finds that the distance from the position calculated by the processor to the position of the target point is less than a limit. This means that the player succeeds in shooting the target point.

For sighting the target point, the game machine may further comprise a sighting device, wherein the image of the target point is formed at the predetermined position on the image plain if the image of the target point on the display plane is correctly sighted by the sighting device. Such a sighting device may include a monitor of field of view given by the image sensor with an indicia positioned at a position in the field of view corresponding to the predetermined position on the image plane. Or, alternatively, the sighting device includes an additional device capable of sighting the image of the target on the display plane with the image sensor not utilized.

According to a detailed feature of the invention, the processor includes a first processor for calculating a first data on the basis of the positions of the image of the known points on the image plane, and a second processor for calculating a second data on the basis of the first data and the positions of the image of the known points on the image plane, the attitude or the position being given on the basis of the second data.

Other features and advantages according to the invention will be readily understood from the detailed description of the preferred embodiment in conjunction with the accompanying drawings.

BRIEF DESCRIPTION OF THE DRAWINGS

FIG. 17A and FIG. 17B represent illustrations for explaining an operation of the second embodiment according to the present invention.

DETAILED DESCRIPTION OF THE PREFERRED EMBODIMENTS

[First Embodiment]

Figure 1:
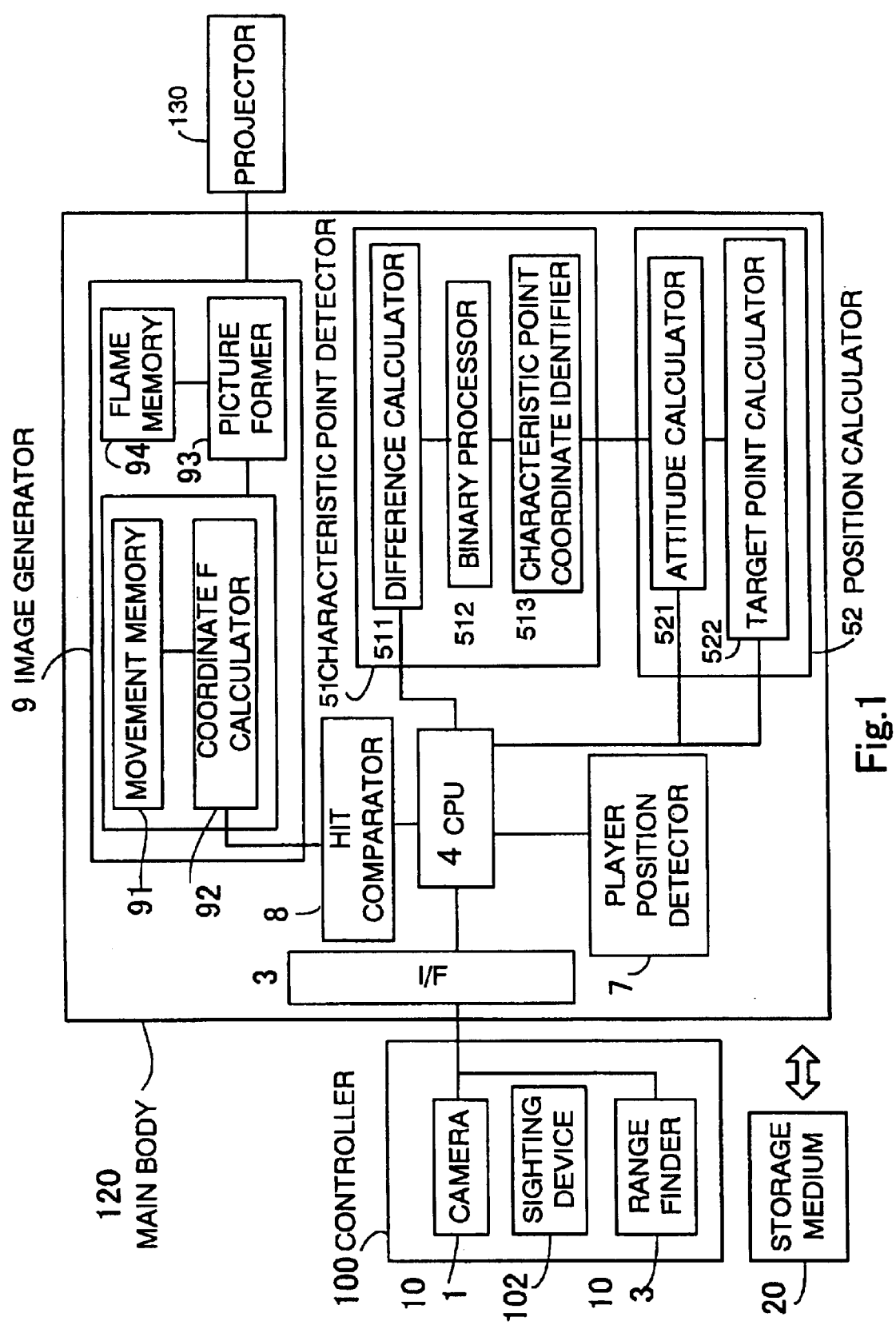
FIG. 1 represents a block diagrams of a game machine of the first embodiment.

FIG. 1 represents a block diagram of a shooting game machine according to the present invention.

The shooting game machine has controller 100 formed as a gun, main body 120 for processing image signal from controller 100 to calculate coordinate data, and image projector 130 controlled by main body 120.

Figure 2:
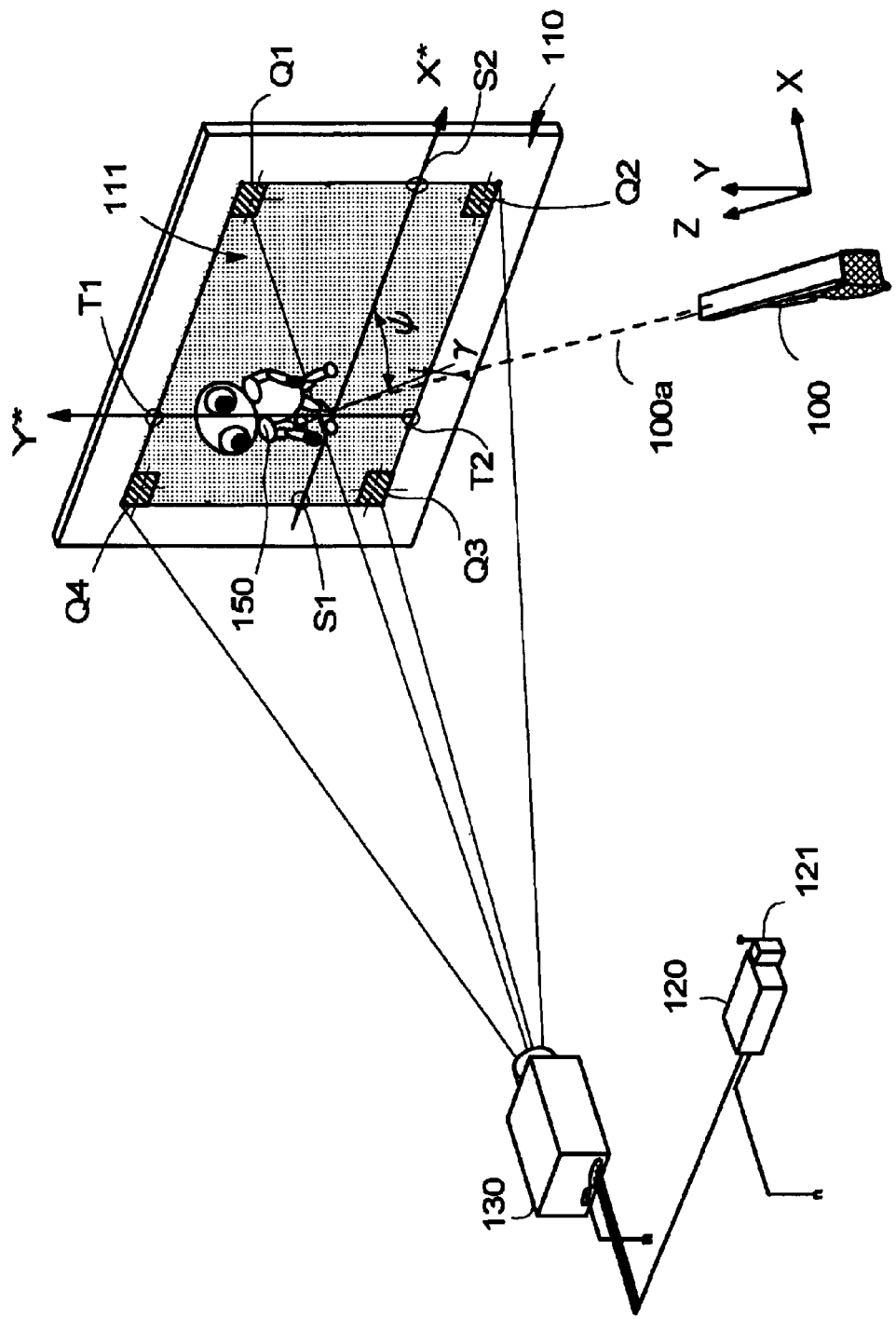
FIG. 2 represents a perspective view of the first embodiment according to the present invention.

FIG. 2 represents a perspective view of the shooting game machine for showing the concept of the game.

Referring to the first embodiment in FIG. 2, Projector 130 projects display image 111 on screen plane 110. The four marks Q1, Q2, Q3 and Q4 of display image 111 are the characteristic points, which define the shape being a rectangular. The controller 100 is for detecting coordinates of a target point Ps on screen plane 110 toward. A player in any desired place relative to screen 110 can handle controller 100. Broken line 100a is the optical axis of the image sensing plane of camera 101 (not shown) located inside the controller 100, broken line 100a leading from the center of the image sensing plane perpendicularly thereto to target point Ps on screen plane 110.

According to the first embodiment, the characteristic points correspond to the four marks projected on screen plane 110. However, the characteristic points may exist at any locations within screen plane 110. For example, some points of a geometric shape within display image 111 projected on screen plane 110 may act as the characteristic points. Alternatively, specially prepared characteristic points may be projected within screen plane 110.

The characteristic points may not be independent points, but may be the intersection of two pairs of parallel lines which are perpendicular to each other. Further, the characteristic points may not be the projected images, but may be light emitting diodes prepared on screen plane 110 in the vicinity of the display image 111.

In FIG. 1, controller 100 has CCD camera 101 for picking up an image, sighting device 102, range finder 103, and operating buttons 104.

Figure 3:
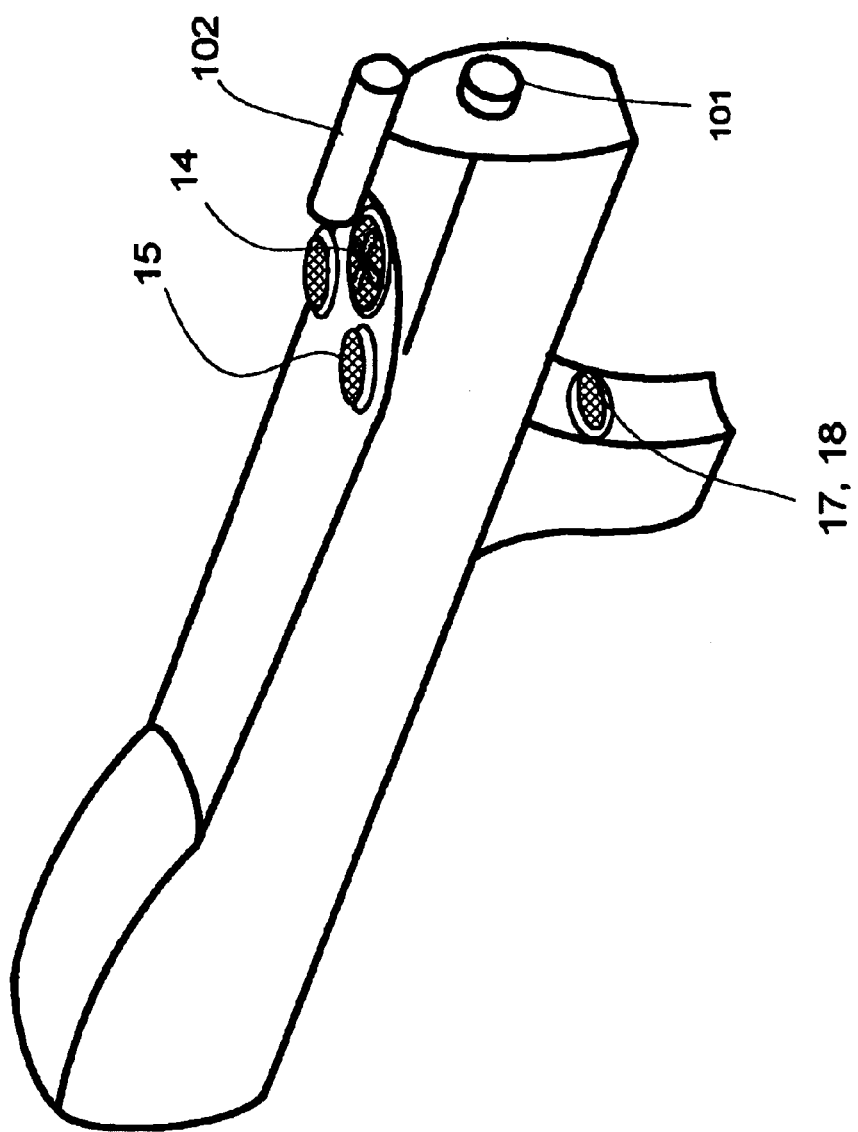
FIG. 3 represents a perspective view of a controller.

FIG. 3 represents a perspective view of a controller. CCD camera 101 includes image sensing plane on which an image of the screen 110 is formed. Range finder 103 measures the distance from controller 100 to the screen 110. Range finder 103 may be of a well-known type, such as a laser range finder. Alternatively, if CCD camera 101 has an automatic focusing device, the necessary information of distance may be gotten from such a device without any additional range finder. Camera 101 needs to define an aiming point for designating the target point Ps on plane 110. According to the first embodiment, the aiming point is defined at the center of the image sensing plane as origin Om of image coordinate (X-Y coordinate).

In FIG. 3, the controller 100 has the shutter release button 18 of a camera 101 to be transmitted toward the target for visually pointing the target point on the screen plane. The sighting device 102 is the optical finder 102A or light beam emitter 102B for the purpose of aiming the target point so that the target point is sensed at the predetermined point on the image sensing plane of CCD 11. The detailed structure of the sighting device 102 being explained later.

Controller 100 further has control buttons 14, 15 to have an object character jump or go up and down, or backward and forward, which is necessary for advancing the game. Input/output interface 3 processes the image data by A/D converter, and transfers the result to image processor. CPU (Central processor) 4 is provided with a ROM storing various programs of the operation system and application software. Outside storage medium 20, such as CD-ROM or DVD, is also prepared for the attachment to main body 120 to enhance the variety of games.

Image processor 5 includes characteristic point detector 51 and position calculator 52. Characteristic point detector 51 detects the characteristic points defining the rectangular plane in a space on the basis of the image data taken by camera 101. The characteristic point detector 51 includes difference calculator 511, binary picture processor 512 and characteristic point coordinate identifier 513.

Position calculator 52 determines the position of the target point on the basis of the coordinate of the identified characteristic points.

Position calculator 52 includes attitude calculator 521 for calculating the rotational parameters of the given screen plane in a space (defined by X-Y-Z coordinate) relative to the image sensing plane and coordinate calculator 522 for calculating the coordinate of the target point on the screen plane.

Figure 4:
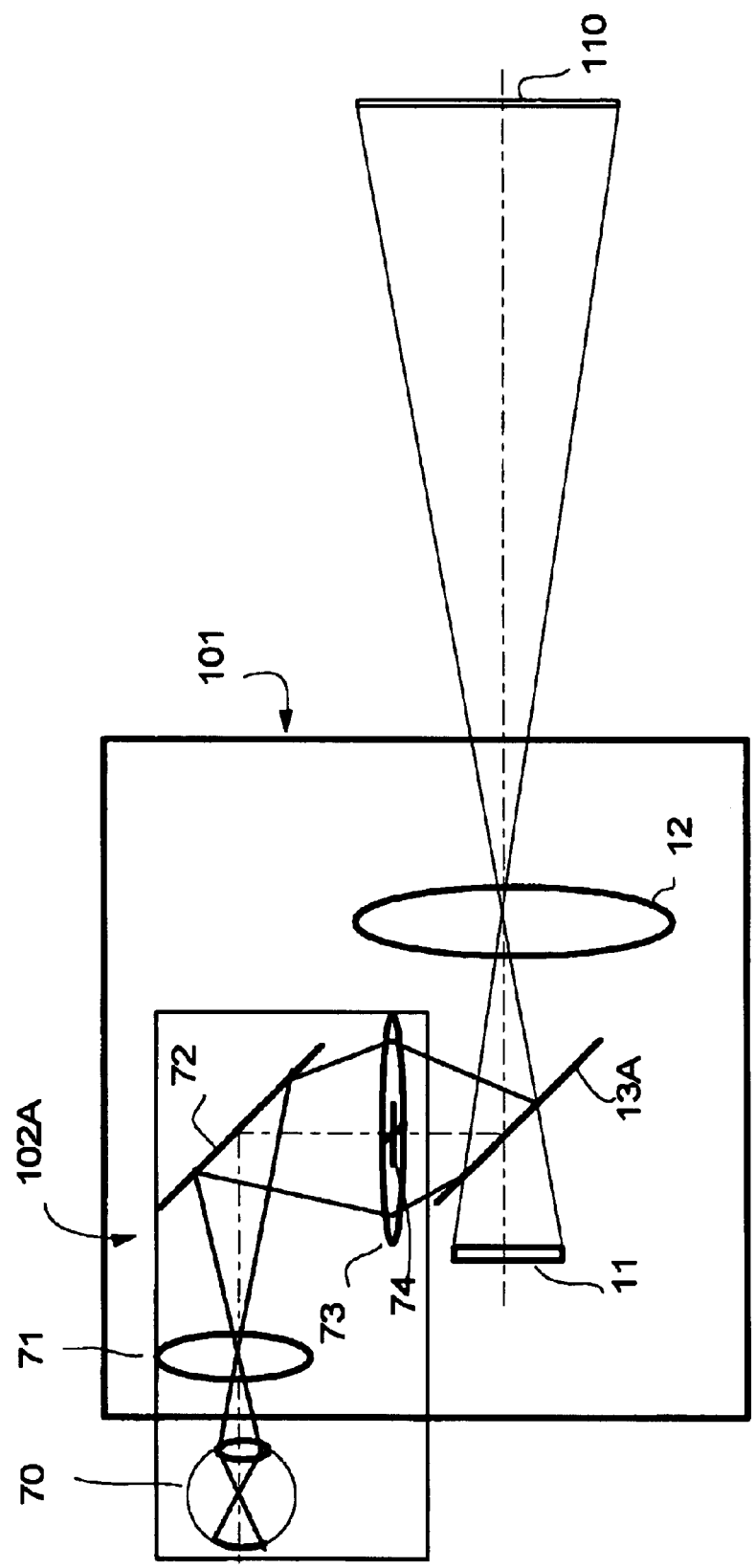
FIG. 4 represents a cross sectional view of the optical system of the controller in FIG. 3.
Figure 5:
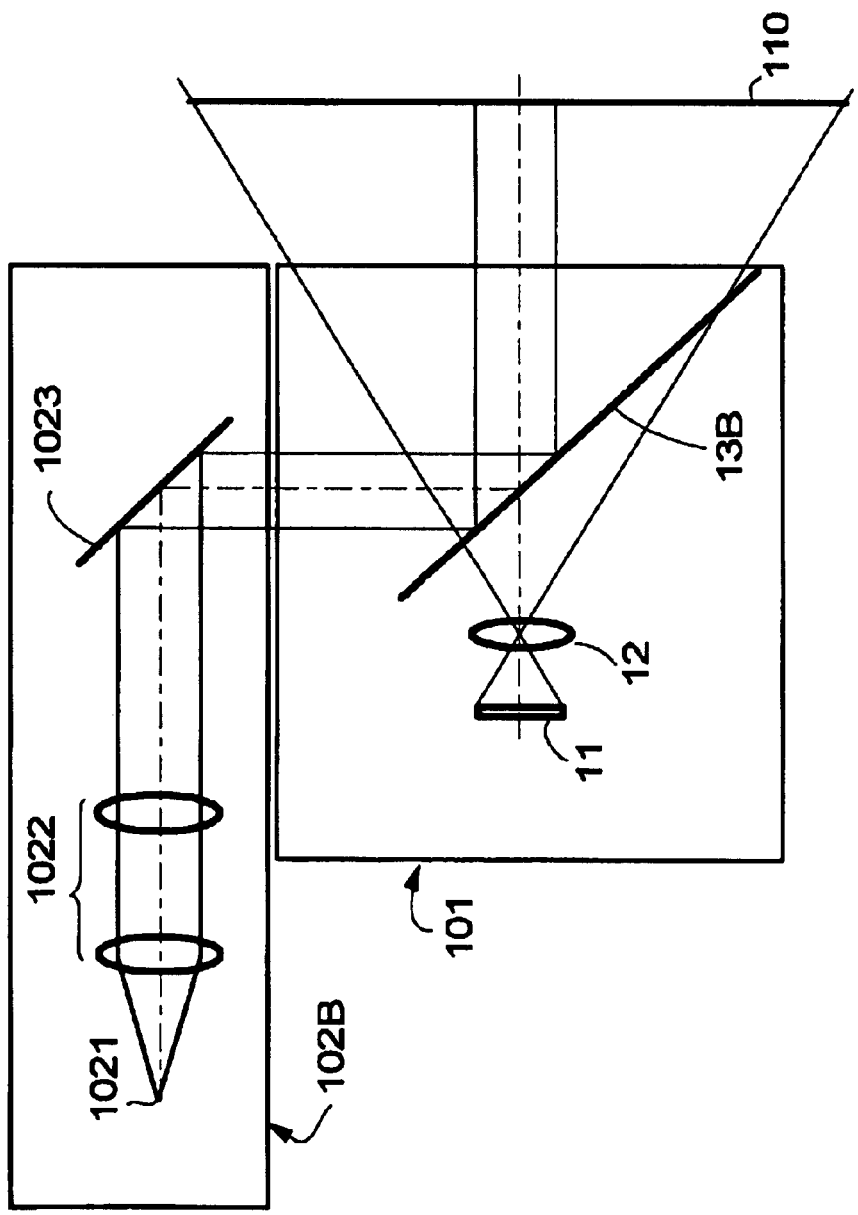
FIG. 5 represents a cross sectional view of a modification of the optical system.

FIGS. 4 and 5 show a cross sectional view of the optical system of controller 100 in FIG. 3.

In FIG. 4, optical finder 102A includes focal plane 73 which is made optically equivalent to the image sensing plane of CCD 11 by means of half mirror 13A. Cross 74 is positioned on focal plane 73, cross 74 being optically equivalent to the predetermined point on the image sensing plane of CCD 11. Human eye 70 observes both cross 74 and the image of rectangular plane 110 on focal plane 73 by way of eyepiece 71 and mirror 72. Thus, if the image is sensed by camera 101 with cross 74 located at the image of the target point on focal plane 73, the target point is sensed at the predetermined point on the image sensing plane of CCD 11.

In FIG. 5, light beam emitter is shown, which can replace optical finder as the other sighting device 102 for the purpose of aiming the target point on the screen plane.

If a power switch 17 is made on, the laser beam is emitted at light source point 1021 and collimated by collimator 1022 to advance on the optical axis of camera 101 toward rectangular plane 110 by way of mirror 1023 and semitransparent mirror 13B. Camera 101 includes objective lens 12 and CCD 11 for sensing image through semitransparent mirror 13B, the power switch 17 of the laser being made off when the image is sensed by camera 101. Therefore, mirror 13B may alternatively be a full refractive mirror, which is retractable from the optical axis when the image is sensed by camera 101. In this embodiment, the position of beam emitter 102B is predetermined relatively to camera 101 so that the path of laser beam from beam emitter 102B coincides with the optical axis of camera 101. By this arrangement, a point on the screen plane 110 which is lit by the laser beam coincides with a predetermined point, such as the center, on the image sensing plane of CCD 11. Thus, if the image is sensed by camera 101 with the laser beam aimed at the target point, the target point is sensed at the predetermined point on the image sensing plane of CCD 11. The laser beam is only help for this purpose. Therefore, the position of light beam emitter 102B relative to camera 101 may alternatively predetermined so that the path of laser beam from beam emitter 102B runs in parallel with the optical axis of camera 101 with mirrors 1023 and 13B removed. In this case, the difference between the path of laser beam and the optical axis of camera 101 can be corrected in the course of calculation. Or, the difference may be in some case negligible.

Position detector 7 is to detect a position of the player who is enjoying the game with controller 100 held by his or her hand, the position being detected relatively to screen 110 to which the player faces. Position detector 7 calculates the position on the basis of the attitude defined by angles α, γ and ψ gotten by attitude calculator 521, the coordinate of position Ps on screen 110 gotten by coordinate calculator 522, and distance L gotten by range finder 103. The position of the player relative to screen 110 detected by position detector 7 is utilized to change the perspective of background virtual reality space of the game projected on screen 110, in front of which the player moves with screen 110 in his or her sight.

In the shooting game according to the first embodiment, a plurality of objects are prepared in the scene on screen 110. Further, each object has a plurality of portions, such as head, hands and legs. comparator 8 judges whether or not one of the objects is shot in one of its portions by means of comparing the position of each portion in each object with the position calculated by coordinate calculator 522. Hit comparator 8 is informed of positions of all portions in all objects to identify the shot object with its specific portion.

Image generator 9 superimposes the relevant objects on the background virtual reality space for display on screen 110 by projector 130. In more detail, image generator 9 includes movement memory 91 for storing a movement data predetermined for each portion of each object, the movement data being to realize a predetermined movement for any object if it is shot in any portion. Further included in image generator 9 is coordinate calculator 92 for converting a movement data selected from movement memory 91 into a screen coordinate through the perspective projection conversion viewed from an image view point, i.e. an imaginary camera view point, along the direction defined by angles α, γ and ψ. Image generator superimposes the calculated screen coordinate on the data of the background virtual reality space by means of picture former 93, the superimposed data thus obtained being stored in frame memory 94.

The above mentioned "image view point" or "imaginary camera view point" means an imaginary point that determines a direction of view for forming a computer graphic picture on a display plane. Such an imaginary point is given by the direction of optical axis, i.e. the direction of view, the field angle and the rotation around the optical axis, or the like.

The movement data for portions of objects stored in movement memory 91 are previously classified into a plurality of directions of view toward screen 110 in accordance with the size of screen 110. For example, the movement data is classified into the following nine classes corresponding to areas determined with angles γ and ψ:

F1(γ2,ψ2),F2(γ2,ψ1),F3(γ2,ψ3),

F4(γ1,ψ2),F5(γ1,ψ1),F6(γ1,ψ3),

F7(γ3,ψ1),F8(γ3,ψ2), and F9(γ3,ψ3), wherein, the values for γ1, γ2, γ3, ψ1, ψ2, and ψ1 are within the following ranges, respectively:

γ2<−5°,−5°≤γ1≤5°,5°<γ3,

ψ2<−20°,−20°≤ψ1≤−20°,20°<ψ1.

Picture former 93 controls the picture formation of the objects and the background virtual reality space in accordance with the advance of the game. For example, a new object will appear in the screen or an existing object will move within the screen in accordance with the advance of the game.

The superimposed data of objects and the background virtual reality space temporally stored in frame memory 94 is combined with the scroll data to form a final frame image data to be projected on screen 110 by projector 130.

The operation of the first embodiment of the shooting game according to the present invention will be described.

Figure 6:
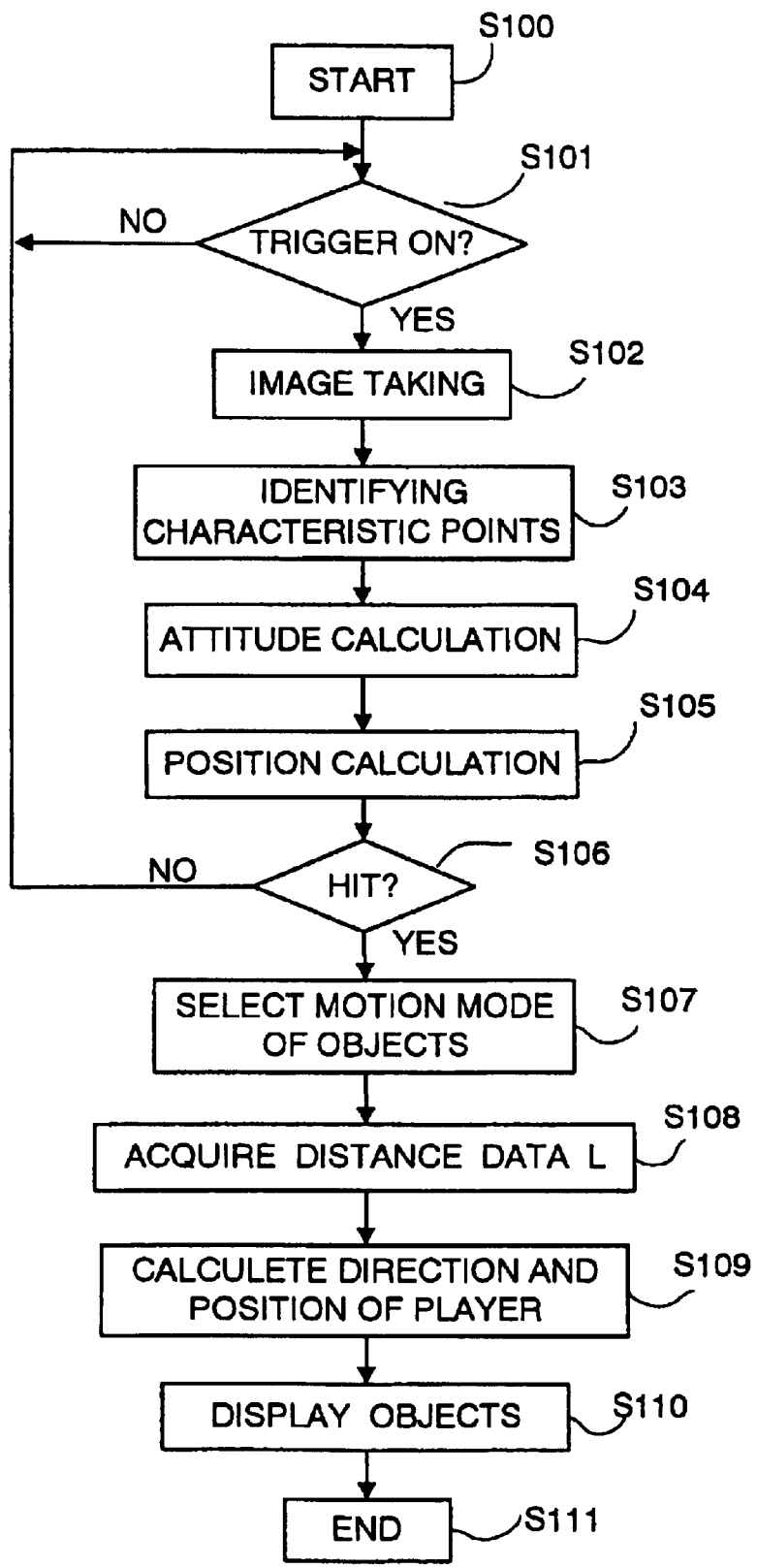
FIG. 6 represents a flow chart for the basic function of the first embodiment according to the present invention.

FIG. 6 represents a flowchart of the basic operation of the shooting game according to the present invention.

In step S100, the main power of the controller is turned on. In step S101, the target point on a screen plane having the plurality of characteristic points is aimed so that the target point is sensed at the predetermined point on the image sensing plane of CCD 11. According to the first embodiment, the predetermined point is specifically the center of image sensing plane of CCD 11 at which the optical axis of the objective lens of camera 101 intersects. In step 102, the image is taken in response to shutter switch (trigger switch) 18 of the camera 101 with the image of the target point at the predetermined point on the image sensing plane of CCD 11.

In step S103, the characteristic points defining the rectangular plane are identified each of the characteristic points being the center of gravity of each of predetermined marks, respectively. The characteristic points are represented by coordinate q1, q2, q3 and q4 on the basis of image sensing plane coordinate.

Step S104 is for processing the rotational parameters for defining the attitude of the screen plane in a space relative to the image sensing plane, and step S105 is calculating the coordinate of the target point on the screen plane, which will be explained later in detail.

In step S106, the coordinate of position of the target point is compared with the coordinate of position calculated in step S105 to find whether the distance from the position calculated by the processor to the position of the target point is less than a limit. In other words it is judged in step S106 whether or not one of the objects is shot in one of its portions. If no object is shot in any of its portions in step S106, the flow returns to step S101 to wait for next trigger by the player since it is shown in step 106 that the player fails in shooting the object. If it is judged in step 106 that one of the objects is shot in one of its portions, the flow advances to step S107, where a predetermined movement is selected in response to the identified shot portion. In more detail, in step S107, the movement data predetermined for the shot portion is retrieved from movement memory 91 to realize the movement for the shot portion. If such movement data includes a plurality of polygon data for a three-dimensional object, a movement with high reality of the object is realized by means of selecting the polygon data in accordance with the attitude calculated in step S104.

In step S108, distance L from controller 100 to the screen 110 gotten by range finder 103 is prepared. And, in step S109, the position of the player with controller 100 relative to screen 110 is calculated on the basis of the attitude defined by angles α, γ and ψ gotten in step S104, the coordinate of position Ps on screen 110 gotten in step S105, and distance L gotten in step S108. The above angles α, γ and ψ defines the attitude of the image plane relative to the screen 110 in such a manner that angles α, γ and ψ are rotations around Z-axis, X-axis and Y-axis of the image coordinate, respectively, wherein Z-axis coincides with optical axis 100a of the lens for the image plane with the origin set at the eye point, which is located behind the image plane by the focal length of the lens. Position Ps is on optical axis 100a, which is shown with a chain line in FIG. 2.

In step S110 the data of movement of the target given through step S109 is combined with the data of position and direction of the player given through step for forming a final image to be displayed on screen 110 by projector 130. The data of position of the player will give a high reality of the change in the target and the background space on screen 110 in accordance with the movement of the player relative to screen 110.

Figure 7:
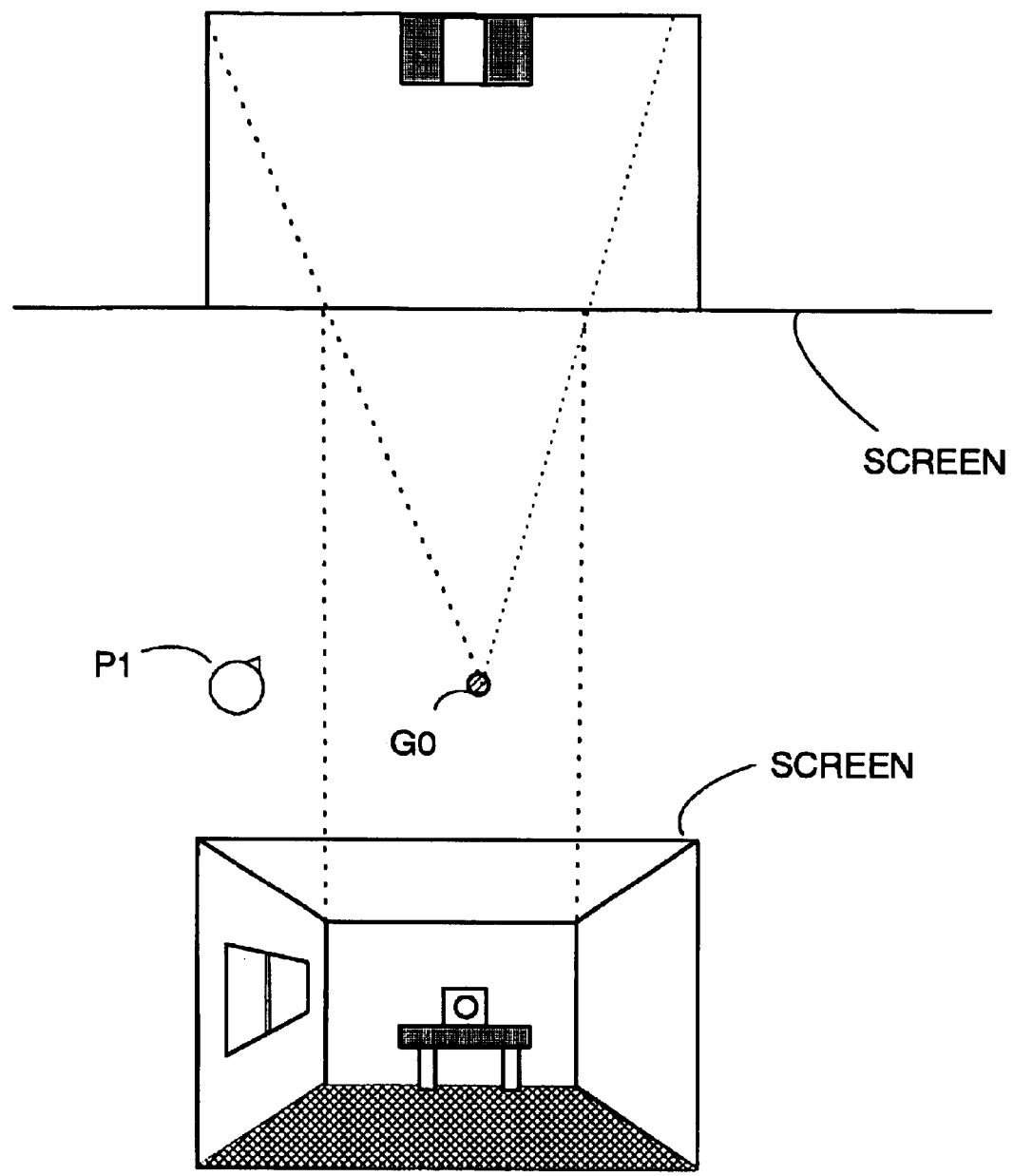
FIG. 7 represents illustrations for explaining the relationship between a real three-dimensional space and its representation on the two-dimensional screen S depending on image view point G0 of the space and position P1 of the player.
Figure 8:
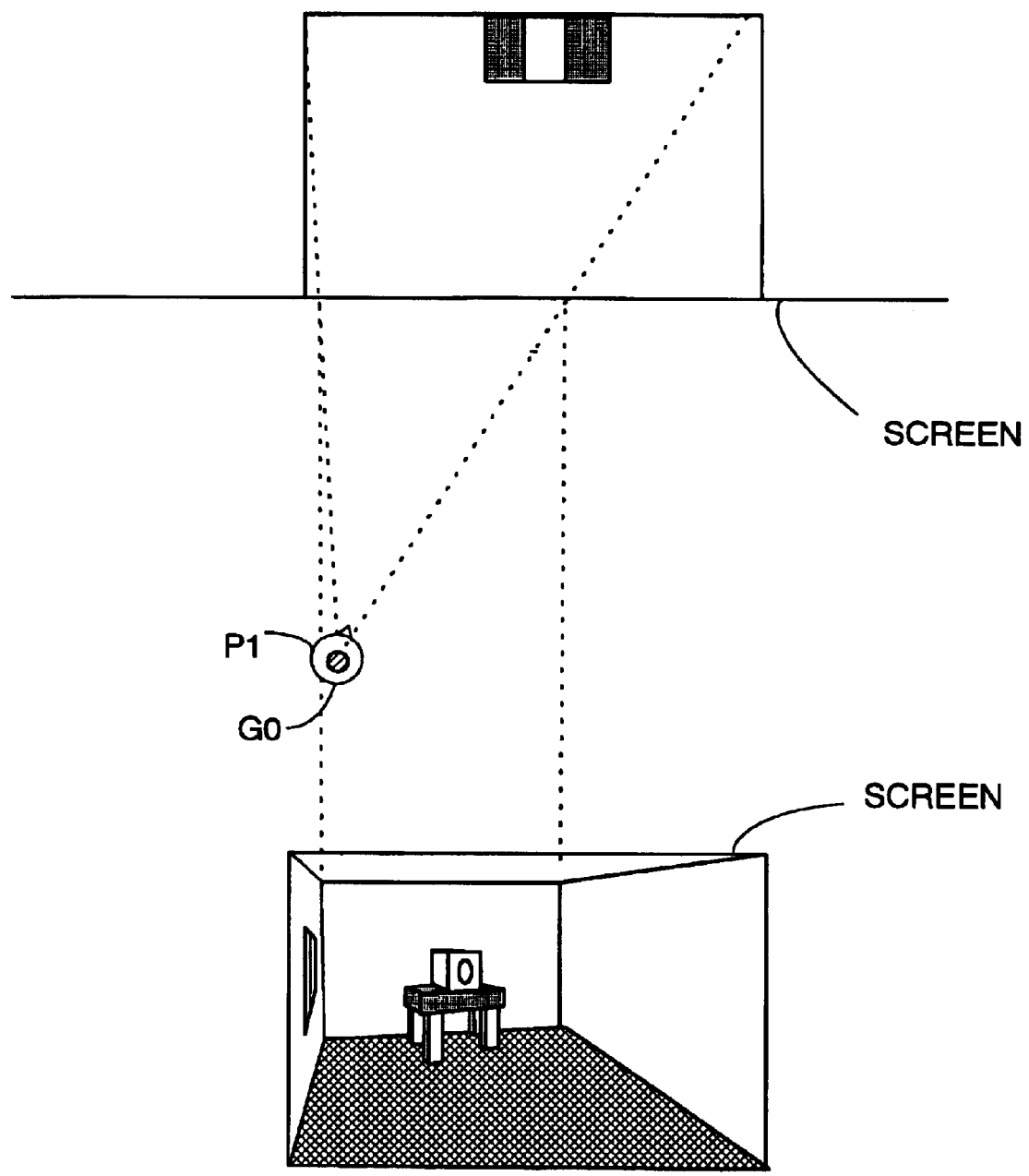
FIG. 8 represents another illustrations for explaining the relationship between a real three-dimensional space and its representation on the two-dimensional screen S depending on image view point G0 of the space and position P1 of the player.

FIGS. 7 and 8 represent illustrations for explaining the relationship between a real three-dimensional space and its representation on the two-dimensional screen S depending on image view point G0 of the space and position P1 of the player. In other words, FIGS. 7 and 8 each includes a plane view showing the relevant locations and a front view of screen S. FIG. 7 corresponds to a case where image view point G0 differs from position P1 of the player, in which the player cannot feel a reality within the space. On the other hand, FIG. 8 corresponds to another case where image view point G0 coincide with position P1 of the player, in which the player feel a virtual reality as if he or she is within the space. According to the present invention the image on screen S can be changed from the case of FIG. 7 to FIG. 8 depending on the calculated attitude of the image plane of the controller relative to the screen.

Though FIGS. 7 and 8 represent illustrations as to a case of a space, the present invention also can change the image of an object on the screen depending on the calculated attitude of the image plane of the controller relative to the screen. Thus, the player can also feel a three-dimensional virtual reality as if he or she moves around the object.

Now, the description will be advanced to the detailed functions of image processor 5 of the first embodiment.

(A) Characteristic Point Detection

Various types of characteristic point detector are possible according to the present invention. For example, in the first embodiment that the given rectangular plane is an image projected on a screen by a projector, the characteristic points are the four marks Q1, Q2, Q3 and Q4 of a rectangular image projected on a screen as in FIG. 2. The image is to taken with all the four marks covered within the image sensing plain of the camera.

For the purpose of detecting the marks without fail in various situations, the projector is arranged to alternately projects a bright and dark images and the camera is released twice in synchronism with the alternation to take the bright and dark images Thus, the marks are detected by the difference between the bright and dark images to finally get the binary picture. At least four marks may be projected within an image on the screen to define a new rectangular inside the image projected on the screen, each of the characteristic points being calculated as the center of gravity of each of marks. Also in this case, the projector is arranged to alternately projects two images with and without the marks, and the camera is released twice in synchronism with the alternation to take the two images. Thus, the marks are detected by the difference between the two images to finally get the binary picture.

(B) Position Calculation

Position calculator calculates a coordinate of a target point Ps on a screen plane defined by characteristic points, the screen plane being located in a space.

Figure 9:
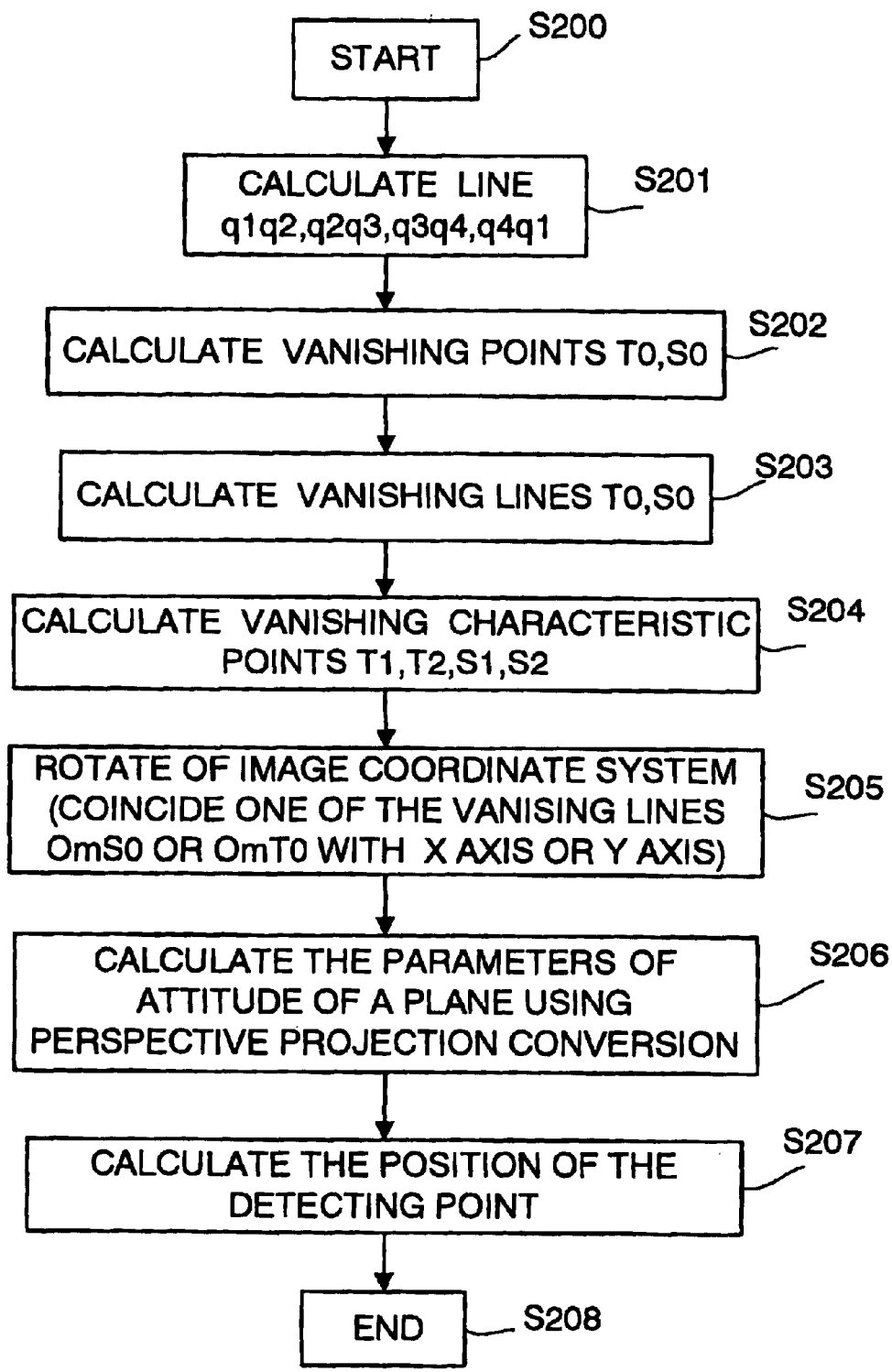
FIG. 9 represents a flow chart of the manner of calculating the coordinate of the target point and corresponds to the details of step S104 and step S105 in FIG. 6.

FIG. 9 shows the manner of calculating the coordinate of the target point and corresponds to the details of step 105 in FIG. 6.

Figure 10:
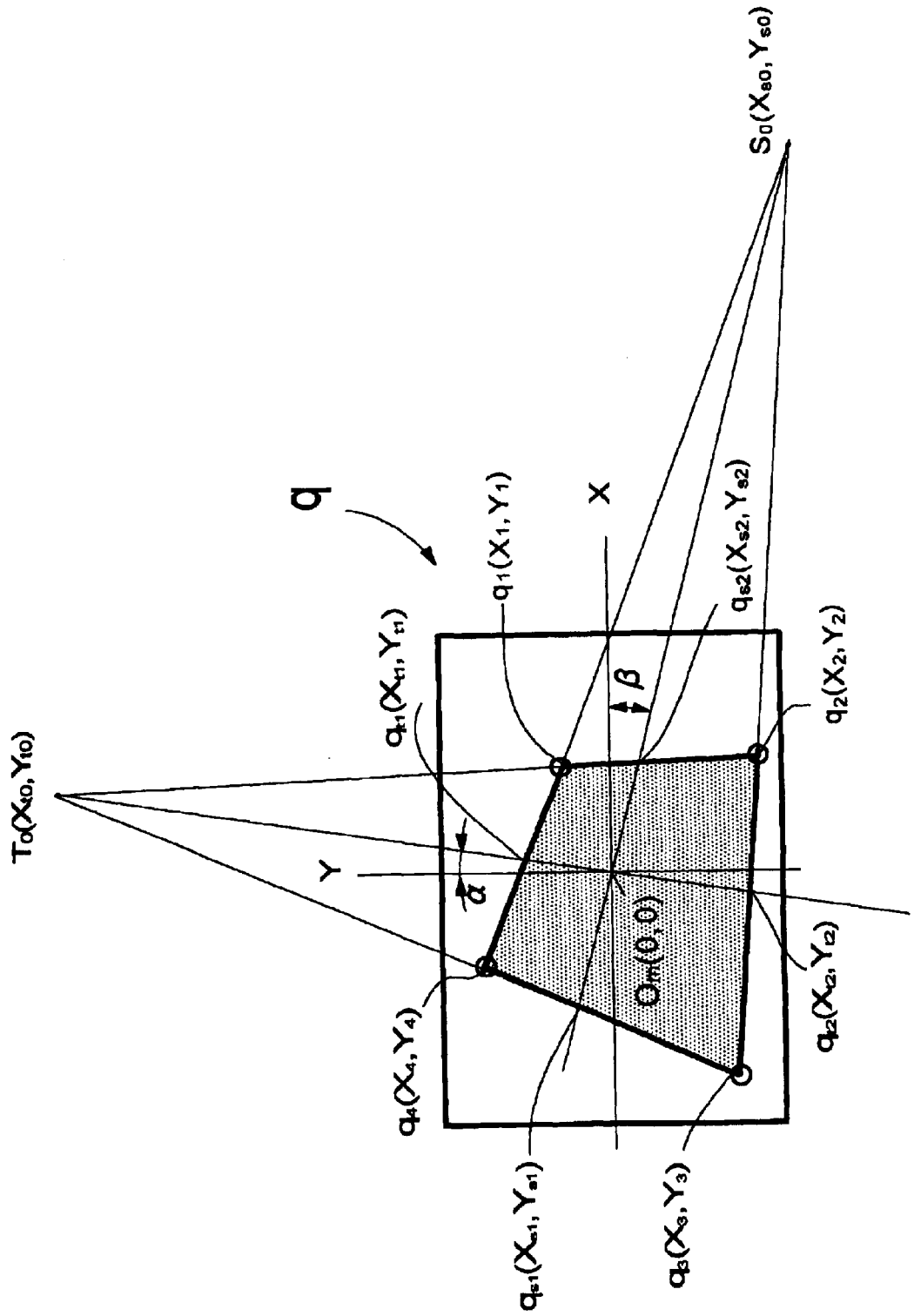
FIG. 10 represents an image taken by the controller, in which the image of target point is within the rectangular defined by the four characteristic points.

FIG. 10 represents the image q taken by the controller 100. In FIG. 10 image of target point Ps is in coincidence with predetermined point Om, which is the origin of the image coordinate. Characteristic points q1, q2, q3 and q4 are the images on the image sensing plane of the original of characteristic points Q1, Q2, Q3 and Q4 on the rectangular plane represented by X*-Y* coordinate.

(b1) Attitude Calculation

Now, the attitude calculation, which is the first step of position calculation, is to be explained in conjugation with the flow chart in FIG. 9.

The parameters for defining the attitude of the given plane with respect to the image sensing plane are rotation angle γ around X-axis, rotation angle ψ around Y-axis, and rotation angle α or β around Z-axis.

Referring to FIG. 9, linear equations for lines q1q2, q2q3, q3q4 and q4q1 are calculated on the basis of coordinates for detected characteristic points q1, q2, q3 and q4 in step S201, lines q1q2, q2q3, q3q4 and q4q1 being defined between neighboring pairs among characteristic points q1, q2, q3 and q4, respectively. In step S202, vanishing points T0 and S0 are calculated on the basis of the liner equations.

The vanishing points defined above exists in the image without fail if a rectangular plane is taken by a camera. The vanishing point is a converging point of lines. If lines q1q2 and q3q4 are completely parallel with each other, the vanishing point exists in infinity.

According to the first embodiment, the plane located in a space is a rectangular having two pairs of parallel lines, which cause two vanishing points on the image sensing plane, one vanishing point approximately on the direction along the X-axis, and the other along the Y-axis.

In FIG. 10, the vanishing point approximately on the direction along the X-axis is denoted with S0, and the other along the Y-axis with T0. Vanishing point T0 is an intersection of lines q1q2 and q3q4.

In step S203, linear vanishing lines OmS0 and OmT0, which are defined between vanishing points and origin Om, are calculated.

Further in step S203, vanishing characteristic points qs1, qs2, qt1 and qt2, which are intersections between vanishing lines OmS0 and OmT0 and lines q3q4, q1q2, q4q1 and q2q3, respectively, are calculated. The coordinates of the vanishing characteristic points are denoted with qs1(Xs1, Ys1), qs2(Xs2,Ys2), qt1(Xt1,Yt1) and qt2(Xt2,Yt2). Line qt1qt2 and qs1qs2 defined between the vanishing characteristic points, respectively, will be called vanishing lines as well as OmS0 and OmT0.

Vanishing lines qt1qt2 and qs1qs2 are necessary to calculate target point Ps on the given rectangular plane. In other words, vanishing characteristic points qt1, qt2, qs1 and qs2 on the image coordinate (X-Y coordinate) correspond to points T1, T2, S1 and S2 on the plane coordinate (X*-Y* coordinate) in FIG. 2, respectively.

If the vanishing point is detected in infinity along X-axis of the image coordinate in step S202, the vanishing line is considered to be in parallel with X-axis.

In step S204, image coordinate (X-Y coordinate) is converted into X'-Y' coordinate by rotating the coordinate by angle β around origin Om so that X-axis coincides with vanishing line OmS0. Alternatively, image coordinate (X-Y coordinate) may be converted into X"-Y" coordinate by rotating the coordinate by angle α around origin Om so that Y-axis coincides with vanishing line OmT0. Only one of the coordinate conversions is necessary according to the first embodiment.

Figure 11:
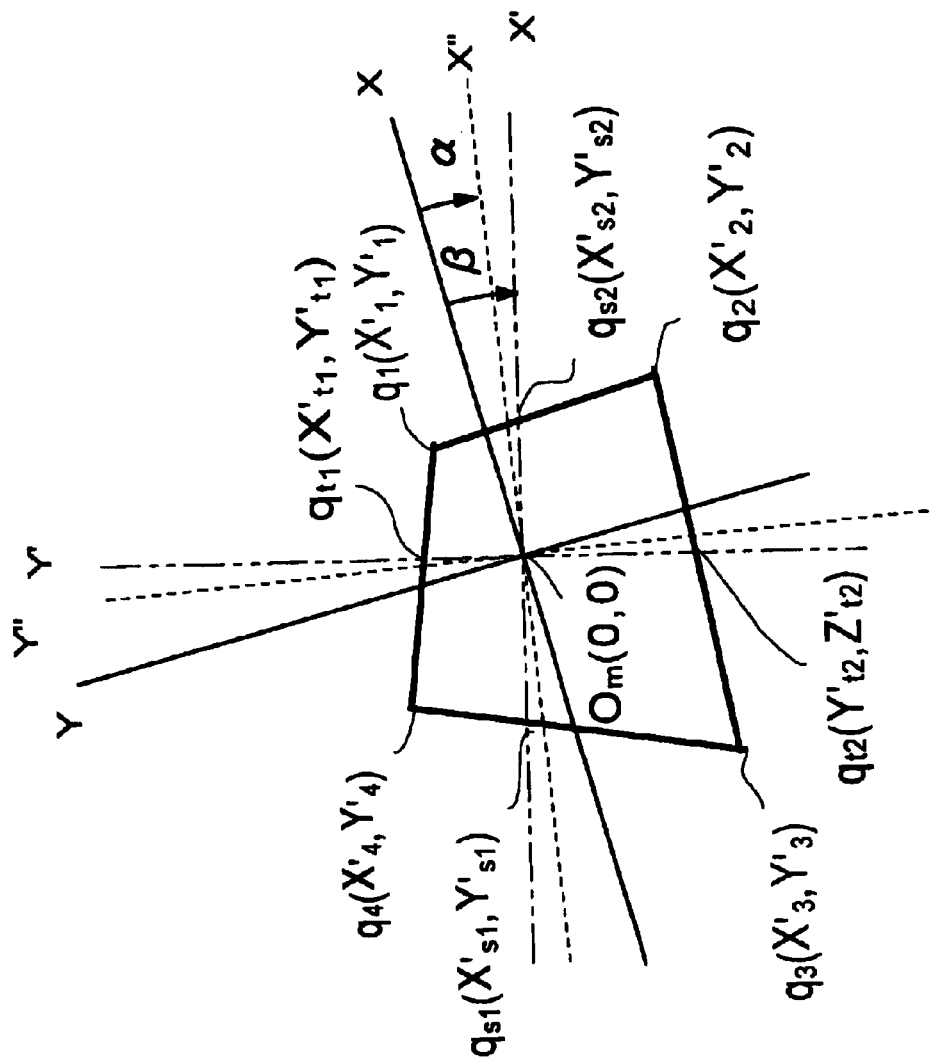
FIG. 11 represents an image under the coordinate conversion from X-Y coordinate to X'-Y' coordinate.

FIG. 11 is to explain the coordinate conversion from X-Y coordinate to X'-Y' coordinate by rotation by angle β around origin Om with the clockwise direction is positive. FIG. 11 also explains the alternative case of coordinate conversion from X-Y coordinate to X"-Y" coordinate by rotating the coordinate by angle α.

The coordinate conversion corresponds to a rotation around Z-axis of a space (X-Y-Z coordinate) to determine one of the parameters defining the attitude of the given rectangular plane in the space. By means of the coincidence of vanishing line qs1qs2 with X-axis, lines Q1Q2 and Q3Q4 are made in parallel with X-axis.

In step S205, characteristic points q1,q2,q3 and q4 and vanishing characteristic points qt1,qt2,qt3 and qt4 on the new image coordinate (X'-Y' coordinate) are related to characteristic points Q1, Q2, Q3 and Q4 and points T1, T2, S1 and S2 on the plane coordinate (X*-Y* coordinate). This is performed by perspective projection conversion according to the geometry. By means of the perspective projection conversion, the attitude of the given rectangular plane in the space (X-Y-Z coordinate) on the basis of the image sensing plane is calculated. In other words, the pair of parameters, angleψ around Y-axis and angleγ around X-axis for defining the attitude of the given rectangular plane are calculated. The perspective projection conversion will be discussed in detail in the following subsection (b11).

In step S206, the coordinate of target point Ps on the plane coordinate (X*-Y* coordinate) is calculated on the basis of the parameters gotten in step S205. The details of the calculation to get the coordinate of target point Ps will be discussed later in section (b2).

(b11) Perspective Projection Conversion

Perspective projection conversion is for calculating the parameters (anglesψ and angleγ) for defining the attitude of the given rectangular plane relative to the image sensing plane on the basis of the four characteristic points identified on image coordinate (X-Y coordinate).

Figure 12:
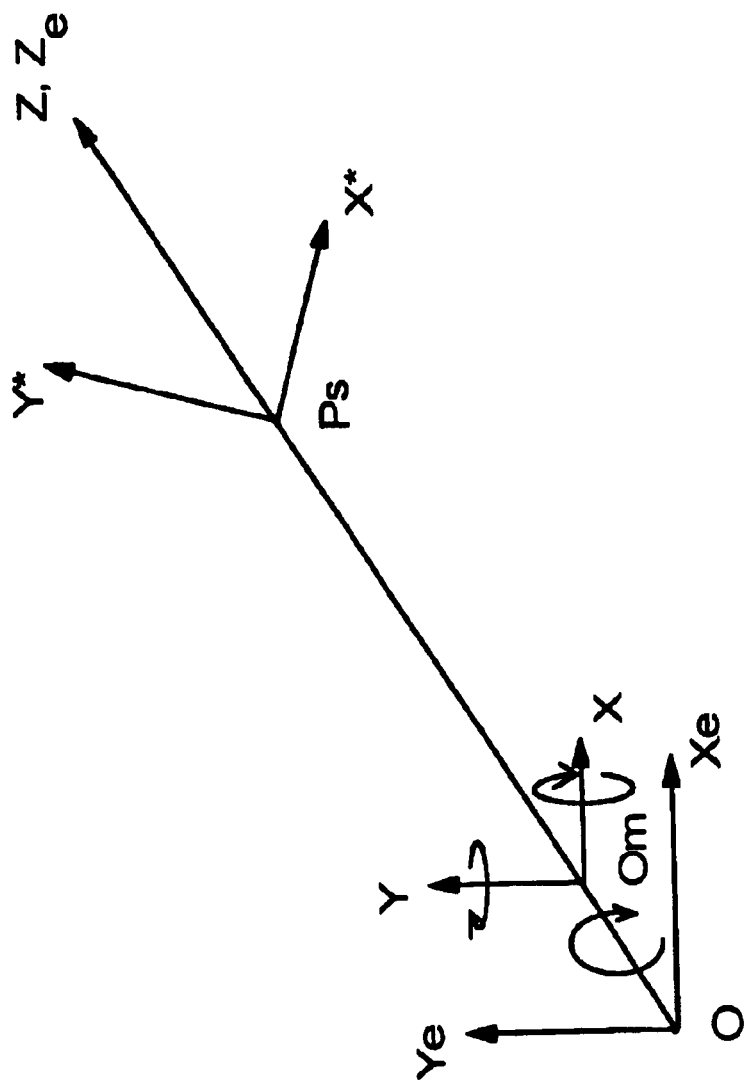
FIG. 12 represents a three-dimensional graph for explaining the spatial relationship between X-Y-Z coordinate representing the equivalent image sensing plane in a space and X*-Y* coordinate representing the given rectangular plane.

FIG. 12 is an explanation of the spatial relationship between X-Y-Z coordinate (hereinafter referred to as "image coordinate") representing the equivalent image sensing plane in a space and X*-Y* coordinate (hereinafter referred to as "plane coordinate") representing the given rectangular plane. Z-axis of image coordinate intersects the center of the equivalent image sensing plain perpendicularly thereto and coincides with the optical axis of the objective lens. View point O for the perspective projection conversion is on Z-axis apart from origin Om of the image coordinate by f. Rotation angle γ around X-axis, rotation angleψ around Y-axis, and two rotation angles α and β both around Z-axis are defined with respect to the image coordinate, the clockwise direction being positive for all the rotation angles. With respect to view point O, Xe-Ye-Ze coordinate is set for perspective projection conversion, Ze-axis being coincident with Z-axis and Xe-axis and Ye-axis being in parallel with which will X-axis and Y-axis, respectively.

Figure 13:
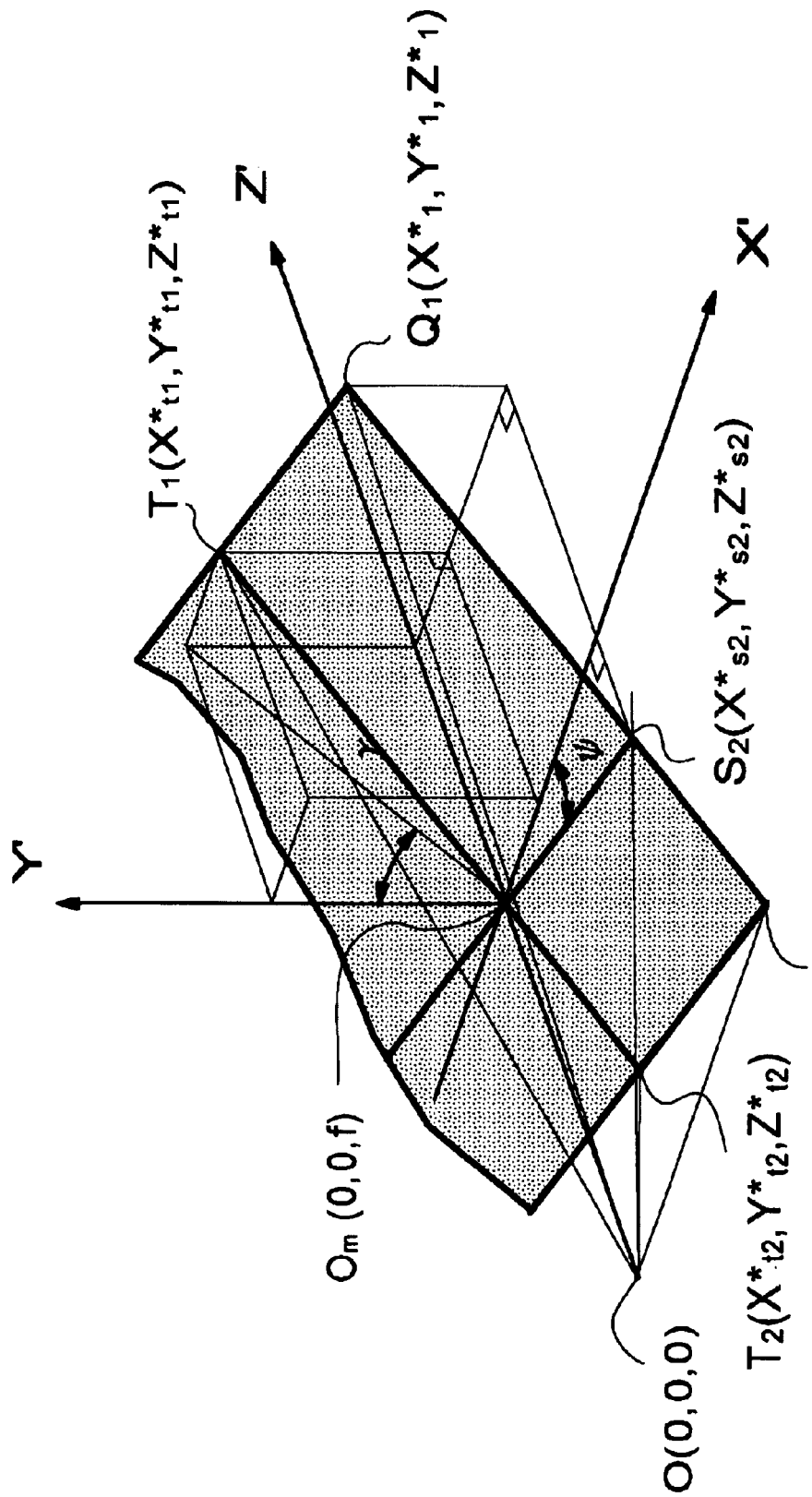
FIG. 13 represents a three-dimensional graph showing a half of the given rectangular plane with characteristic points Q1 and Q2.

FIG. 13 shows the perspective projection conversion in three-dimensional manner for calculating the attitude of the rectangular plane given in a space (X-Y-Z coordinate) relative to the image sensing plane. Hereinafter the equivalent image sensing plane and the equivalent rectangular plane will be simply referred to as "image sensing plane" and "given rectangular plane", respectively. The given rectangular plane is rotated around Z-axis, which is equal to Z'-axis, by angleβ in FIG. 12 so that Y'-axis is made in parallel with Ye-axis not shown.

In FIG. 13, a half of the given rectangular plane is shown with characteristic points Q1(X*1, Y*1, Z*1) and Q2(X*2, Y*2, Z*2). Points T1(X*t1, Y*t1, Z*t1), T2(X*t2, Y*t2, Z*t2) and S2(X*s2, Y*s2, Z*s2) are also shown in FIG. 13. The remaining half of the given rectangular plane and the points such as Q3, Q4 and S1 are omitted from FIG. 13. Further, there are shown in FIG. 13 origin Om(0,0,f) coincident with target point Ps and view point O(0,0,0), which is the origin of Xe-Ye-Ze coordinate.

Line T1Om is on Y'-Z' plane and rotated by angel γ around X'-axis, while line S2Om is on X'-Z' plane and rotated by angelψ around Y'-axis, the clockwise directions of rotation being positive, respectively. The coordinates of Q1, Q2, T1, T2 and S2 can be calculated on the basis of the coordinates of q1, q2, qt1, qt2 and qs2 through the perspective projection conversion.

Figure 14:
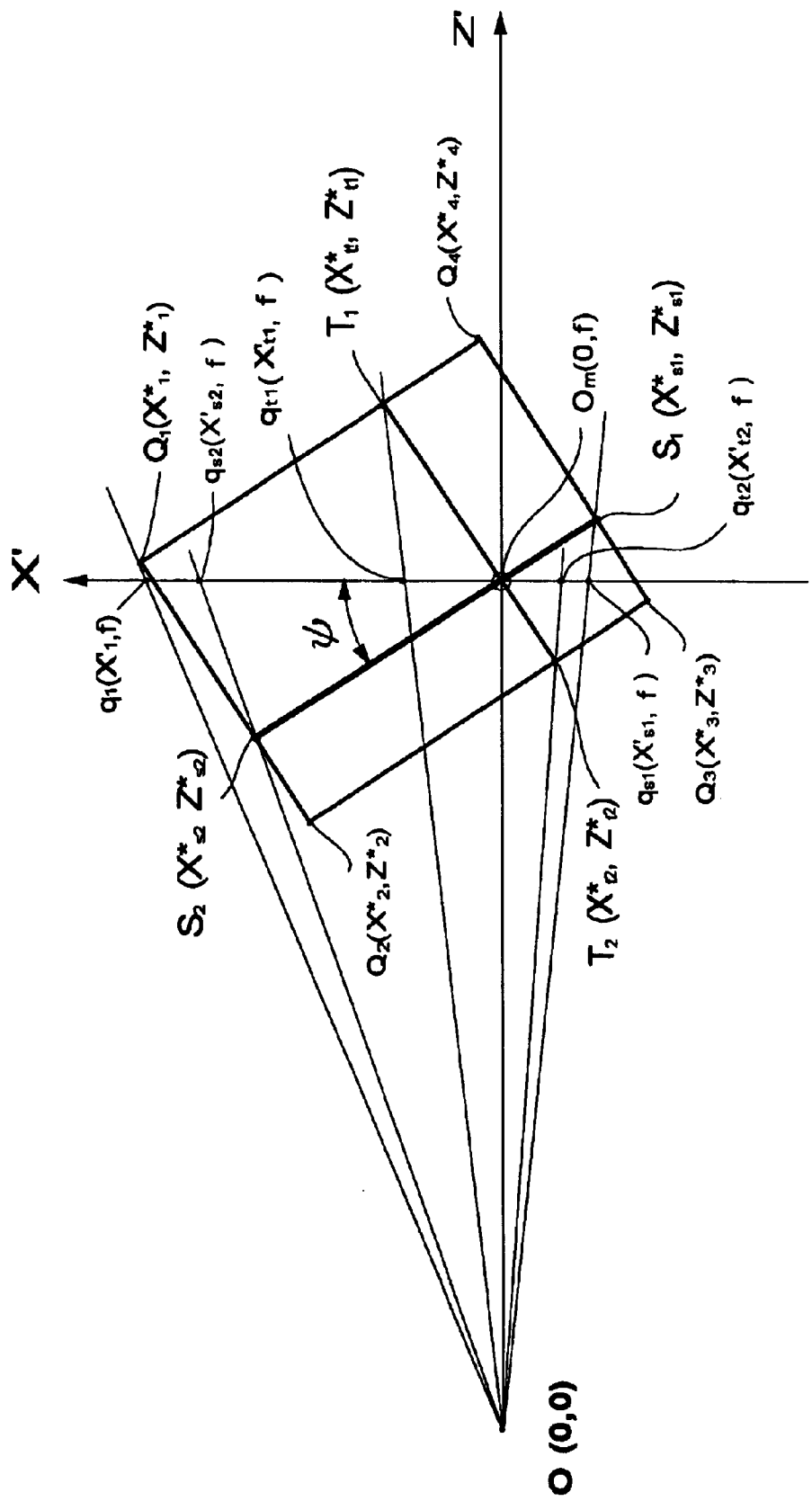
FIG. 14 represents a two-dimensional graph of an orthogonal projection of the three-dimensional rectangular plane in FIG. 13 onto X'-Z' plane.

FIG. 14 represents a two-dimensional graph showing an orthogonal projection of the three-dimensional rectangular plane in FIG. 13 onto X'-Z' plane in which Y'=0. In FIG. 14, only line S1S2 denoted by the thick line is really on X'-Z' plane, while the other lines on the rectangular plane are on the X'-Z' plane through the orthogonal projection.

According to FIG. 14, the X'-Z' coordinates of T1($X^*$t1, $z^*$t1), T2($X^*$t2,$Z^*$t2), S1($X^*$s1,$Z^*$s1), S2($X^*$s2,$Z^*$s2) and Q1($X^*$1,$Z^*$1) can be geometrically calculated on the basis of the X'-Z' coordinates of qt1(X't1,f), qt2(X't2,f), qs1(X's1, f), qs2(X's2,f) and q1(X'1,f) and angle ψ as in the following equations (1) to (5):

$$T_1(X_{t1}^*, Z_{t1}^*) = \left[ \frac{X_{t1}' \cdot f \cdot \tan\phi}{f \cdot \tan\phi - X_{t1}'}, \frac{f^2 \cdot \tan\phi}{f \cdot \tan\phi - X_{t1}'} \right] \quad (1)$$

$$T_2(X_{t2}^*, Z_{t2}^*) = \left[ \frac{X_{t2}' \cdot f \cdot \tan\phi}{f \cdot \tan\phi - X_{t2}'}, \frac{f^2 \cdot \tan\phi}{f \cdot \tan\phi - X_{t2}'} \right] \quad (2)$$

$$S_1(X_{s1}^*, Z_{s1}^*) = \left[ \frac{f \cdot X_{s1}'}{X_{s1}' \cdot \tan\phi + f}, \frac{f^2}{X_{s1}' \cdot \tan\phi + f} \right] \quad (3)$$

$$S_2(X_{s2}^*, Z_{s2}^*) = \left[ \frac{f \cdot X_{s2}'}{X_{s2}' \cdot \tan\phi + f}, \frac{f^2}{X_{s2}' \cdot \tan\phi + f} \right] \quad (4)$$

$$Q_1(X_1^*, Z_1^*) = \left[ \frac{X_1'}{X_{s2}'} \frac{f \cdot \tan\phi - X_{s2}'}{f \cdot \tan\phi - X_1'} \cdot X_{s2}^*, \frac{f}{X_{s2}'} \cdot \frac{f \cdot \tan\phi - X_{s2}'}{f \cdot \tan\phi - X_1'} \cdot X_{s2}^* \right] \quad (5)$$

For the purpose of the following discussion, only one of X'-Z' coordinates of the characteristic points Q1 to Q4 is necessary. Equation (5) for Q1 may be replaced by a similar equation for any one of characteristic points Q2 to Q4.

Figure 15:
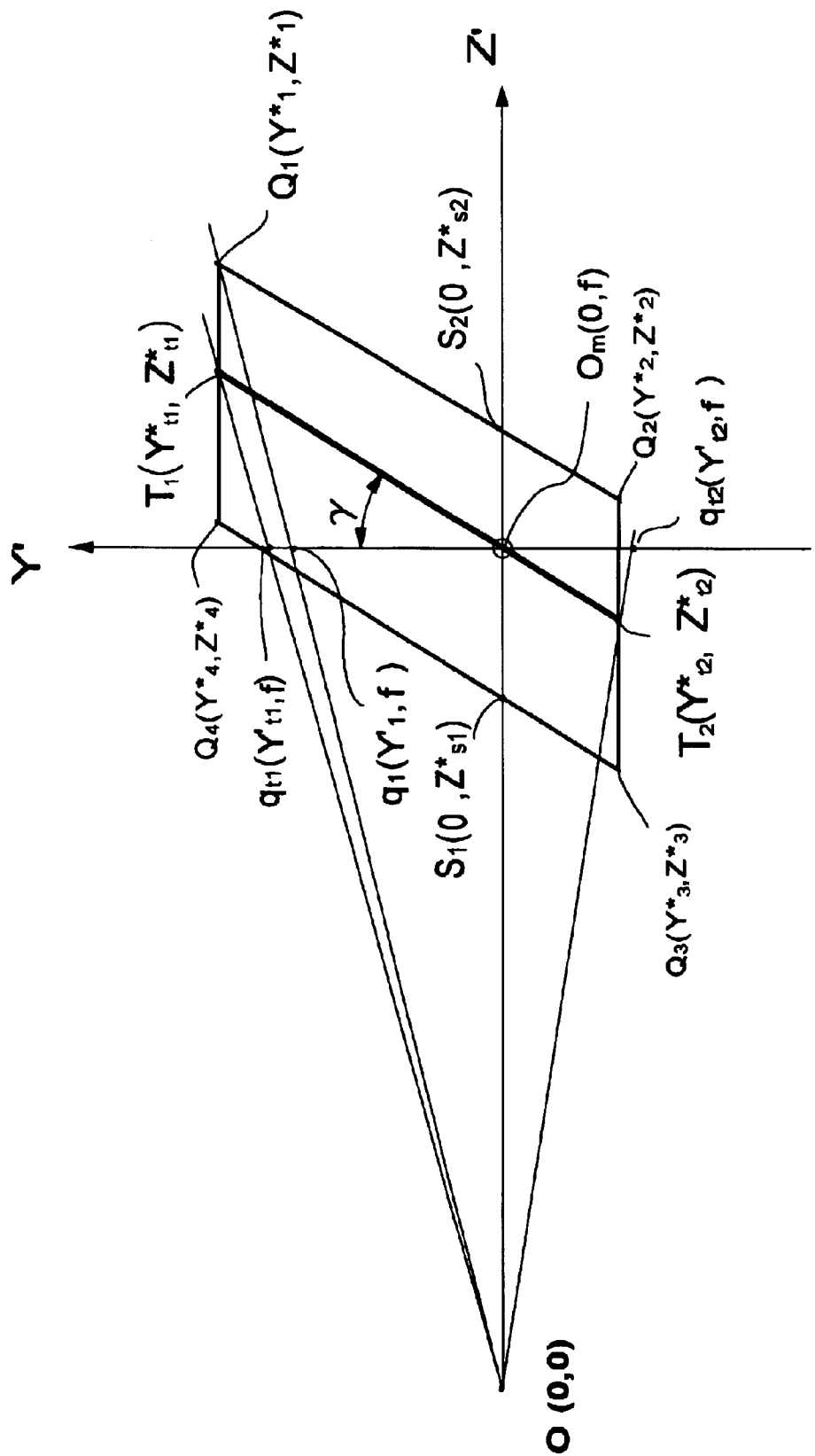
FIG. 15 represents a two-dimensional graph of an orthogonal projection of the three-dimensional rectangular plane in FIG. 13 onto Y'-Z' plane.

On the other hand, FIG. 15 represents a orthogonal projection of the three-dimensional rectangular plane onto Y'-Z' plane in which X'=0. In FIG. 15, only line T1T2 denoted by the thick line is really on Y'-Z' plane, while the other lines on the rectangular plane are on the Y'-Z' plane through the orthogonal projection. According to FIG. 15, the Y'-Z' coordinates of T1($Y^*$t1,$Z^*$t1), T2($Y^*$t2,$Z^*$t2), S1(0, $Z^*$s1), S2(0,$Z^*$s2) and Q1($Y^*$1,$Z^*$1) can be geometrically calculated on the basis of the Y'-Z' coordinates of qt1(Y't1, f), qt2(Y't2,f), qs1(Y's1,f), qs2(Y's2,f) and q1(Y'1,f) and angle γ as in the following equations (6) to (10):

$$T_1(Y_{t1}^*, Z_{t1}^*) = \left[ \frac{Y_{t1}' \cdot f}{f - Y_{t1}'\tan\gamma}, \frac{f^2}{f - Y_{t1}'\tan\gamma} \right] \quad (6)$$

$$T_2(Y_{t2}^*, Z_{t2}^*) = \left[ \frac{Y_{t2}' \cdot f}{f - Y_{t2}'\tan\gamma}, \frac{f^2}{f - Y_{t2}'\tan\gamma} \right] \quad (7)$$

$$S_1(Y_{s1}^*, Z_{s1}^*) = \left[ 0, \frac{f^2 \cdot \tan\gamma}{Y_{s1}' + f \cdot \tan\gamma} \right] \quad (8)$$

$$S_2(Y_{s2}^*, Z_{s2}^*) = \left[ 0, \frac{f^2 \cdot \tan\gamma}{Y_{s2}' + f \cdot \tan\gamma} \right] \quad (9)$$

$$Q_1(Y_1^*, Z_1^*) = \left[ \frac{Y_1'}{f - Y_1' \cdot \tan\gamma} \cdot Z_{s2}^*, \frac{f}{f - Y_1' \cdot \tan\gamma} \cdot Z_{s2}^* \right] \quad (10)$$

The $Y^*$-coordinate of S1 and S2 in equations (8) and (9) are zero since the X-Y coordinate is rotated around Z axis by angleβ so that X-axis coincides with vanishing line S1S2, angle β being one of the parameters for defining the attitude of the given rectangular plane relative to the image sensing plane.

Since the $Z^*$-coordinate of T1 in equation (1) is just the same as that in equation (6), the following equation (11) results:

$$\frac{f^2}{f - Y_{t1}' \cdot \tan\gamma} = \frac{f^2 \cdot \tan\phi}{f \cdot \tan\phi - X_{t1}'} \quad (11)$$

Similarly, the following equation (12) results from equations (5) and (10) both relating to the $Z^*$-coordinate of Q1:

$$\frac{f}{f - Y_1' \cdot \tan\gamma} \cdot Z_{s2}^* = \frac{f}{X_{s2}'} \cdot \frac{f \cdot \tan\phi - X_{s2}'}{f \cdot \tan\phi - X_1'} \cdot X_{s2}^* \quad (12)$$

Equation (11) can be simplified into the following equation (13):

$$\tan\gamma = \frac{1}{\tan\phi} \cdot \frac{X_{t1}'}{Y_{t1}'} \quad (13)$$

And equation (11) can be modified into the following equation (14) by substituting $X^*$s2 and $Z^*$s2 with equation (4), and tanγ with equation (13):

$$\tan\phi = \frac{X_{t1}' X_{s2}' Y_1'}{X_{t1}' Y_1' + X_{s2}' Y_{t1}' - X_1' Y_{t1}'} \cdot \frac{1}{f} \quad (14)$$

Equations (13) and (14) are conclusion of defining angles γ and ψ which are the other two of parameters for defining the attitude of the given rectangular plane relative to the image sensing plane. The value for tanγ given by equation (13) can be practically calculated by replacing tanψ by the value calculated through equation (14). Thus, all of the three angles β, γ and ψ are obtainable.

As in equations (13) and (14), angles γ and ψ are expressed by the coordinate of characteristic point q1 (X'1, Y'1) and the coordinate of a vanishing characteristic points qt1(X't1, Y't1) and qs2(x's2) which are calculated on the basis of the coordinates. Distance f in the equation is a known value. Thus, the attitude of the given rectangular plane relative to the image sensing plane can be uniquely determined by the positions of the characteristic points on the image plane.

According to present invention, any complex matrix conversion or the like is not necessary for calculating parameters of the attitude of the given rectangular plane, but such simple form of equations as equations (13) and (14) are sufficient for the same purpose. This leads to various advantages, such as a reduced burden on the calculating function, a less error or high accuracy in calculation and a low cost of the product.

Further, only condition necessary for the calculation according to the present invention is that the characteristic points on the given plane are required to define a rectangle. In other words, any specific information such as the aspect ratio of the rectangle or the relation among the coordinates of the corners of the rectangle is not necessary at all. Further, an information of the distance from the image sensing plane to the given plane is not necessary in the calculation according to the present invention.

Equations (15) and (16) are another forms of conclusion, in which the analysis is made with the counter clockwise rotation around Y-axis defined as positive direction for representing ψ on the contrary to equations (13) and (14):

$$\tan\gamma = -\frac{1}{\tan\phi} \cdot \frac{X'_{tl}}{Y'_{tl}} \quad (15)$$

$$\tan\phi = \frac{Y'_1 - Y'_{tl}}{X'_{tl}Y'_1 - X'_1 Y'_{tl}} \cdot f \quad (16)$$

In the case of equations (15) and (16), at least one coordinate of characteristic point q1 (X'1, Y'1), at least one coordinate of a vanishing characteristic point qt1(X't1, Y't1) and distance f are only necessary to get angles γ and ψ.

(b2) Coordinate Calculation

Now, the coordinate calculation for determining the coordinate of the target point on the given rectangular plane is to be explained. The position of target point Ps on given rectangular plane 110 with the plane coordinate (X*-Y* coordinate) in FIG. 2 is calculated by coordinate calculator 522 in FIG. 1 on the basis of the parameters for defining the attitude of the given rectangular plane obtained by attitude calculator 521.

Referring to FIG. 14, ratio m=OmS1/OmS2 represents the position of Om along the direction in parallel with that of Q3Q2, while ratio n=OmT1/OmT2 represents the position of Om along the direction in parallel with that of Q3Q4, which is perpendicular to Q3Q2. And, ratio m and ratio n can be expressed as in the following equations (17) and (18), respectively, in view of equations (1) to (4) in which coordinates of S1(X*s1,Z*s1), S2(X*s2,Z*s2), T1(X*t1, Z*t1) and T2(X*t2,Z*t2) are given by coordinates of qs1 (X's1,f) and qs2(X's2,f), qt1(X't1,f) and qt2(X't2,f):

$$m = \frac{\overline{O_m S_1}}{\overline{O_m S_2}} = \frac{|X'_{s1}|}{|X'_{s2}|} \cdot \frac{|X'_{s2} \cdot \tan\phi + f|}{|X'_{s1} \cdot \tan\phi + f|} \quad (17)$$

$$n = \frac{\overline{O_m T_1}}{\overline{O_m T_2}} = \frac{|X'_{t1}|}{|X'_{t2}|} \cdot \frac{|f \cdot \tan\phi - X'_{t2}|}{|f \cdot \tan\phi - X'_{t1}|} \quad (18)$$

Equation (17) is given by the X'-coordinate of vanishing characteristic points qs1(X's1) and qs2(X's2), distance f and angle ψ, while equation (18) by the X'-coordinate of vanishing characteristic points qt1(X't1), qt2(X't2), distance f and angle ψ. With respect to angle ψ, tanψ is given by equation (14).

Figures 16A, 16B:
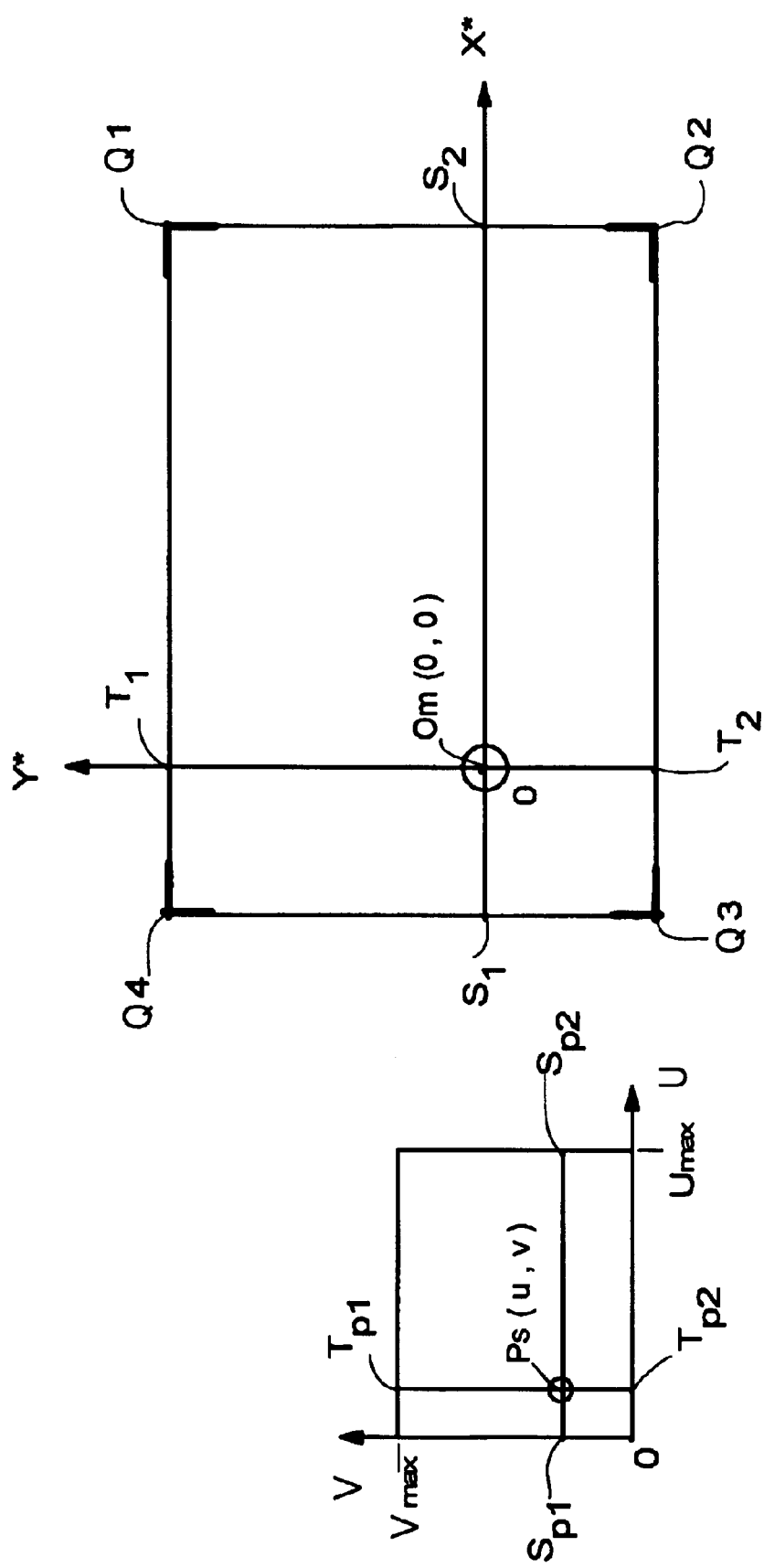
FIG. 16A represents a graph of U-V coordinate in which a point corresponding to characteristic point Q3 is set as origin O.
FIG. 16B represents a graph of X*-Y* coordinate in which Om is set as the origin.

FIGS. 16A and 16B represent conversion from ratio m and ratio n to a coordinate of target point Ps in which characteristic point Q3 is set as the origin of the coordinate. In more detail, FIG. 16B is shown in accordance with X*-Y* coordinate in which Om(0,f), which is in coincidence with target point Ps, is set as the origin, while FIG. 16A shown in accordance with U-V coordinate in which a point corresponding to characteristic point Q3 is set as origin O. Further, characteristic points Q2 and Q4 in FIG. 16B correspond to Umax on U-axis and Vmax on V-axis, respectively, in FIG. 16A. According to FIG. 16A, coordinate of target point Ps(u,v) is given by the following equation (19):

$$P_s(u, v) = \left(\frac{m}{m+1} \cdot U_{max}, \frac{n}{n+1} \cdot V_{max}\right) \quad (19)$$

[Second Embodiment]

FIG. 17A and FIG. 17B represent illustrations for explaining an operation of the second embodiment according to the present invention. In contrast to the first embodiment, in which an image of a target is displayed on a display plane such as a screen, the second embodiment controls a real object.

The upper portion of FIG. 17A represents a plan view of real object 801 and controller 802 such as a gun held by a player. The lower portion of FIG. 17A, on the other hand represents a front view of the image plane 803 in controller 802, through which the image of real object 801 is viewed.

In FIG. 17A or in FIG. 17B, real object 801 is mounted on cubic base 804 that is rotatable around axis 805 by means of a motor within cubic base 804. Thus, real object 801 would rotate with cubic base 804 in a body if the motor is controlled to rotate cubic base 804 to cause a directional change in real object. At the four front corners of Cubic base 804, light emitting diodes 806a, 806b, 806c and 806d are provided to serve as the four characteristic points. The attitude of the plane defined by the light emitting diodes 806a, 806b, 806c and 806d relative to image plane 803 would change if cubic base 804 rotates. In the case of FIG. 17A, real object 801 does not face to the player. This means that controller 802 sights real object 801 slantwise to result in a image of a quadrangle defined by four light emitting diodes 806a, 806b, 806c and 806d drawn in perspective in image plane 803. Such positions of images of light emitting diodes 806a, 806b, 806c and 806d on image plane can be detected and analyzed to calculate the attitude of the real object 801 relative to image plane 803. Further in FIG. 17A, the image of hand 801a of real object 801 is formed at indicia 803a on image plane 803. If the player triggers the gun with this situation kept, distance between the correct position of hand 801a and the calculated position of the object field corresponding to the indicia 803a on image plane 803 is determined less than a limit by the comparison. This means that the player has successfully shot real object 801 in hand 801a.

According to the story of the game, the damage of real object 801 is not serious even if it is shot in hand 801a. Thus, the motor rotates cubic base 804 by the angle determined by the calculated attitude of the plane defined by light emitting diodes 806a, 806b, 806c and 806d relative to image plane 803 to face real object 801 toward the player. Thus, real object 801 facing to the player will respond with shots toward the player.

FIG. 17B shows the situation after the above described rotation of cubic base 804, in which real object facing the player holding controller 802 as in the upper portion of FIG. 17B. In the lower portion of FIG. 17B, the image of four light emitting diodes 806a, 806b, 806c and 807d form a rectangle on image plane 803 since the front four corners of cubic base 804 faces controller 802.

The present invention can provide an extremely attractive game effect with high reality by means of detecting the position of player through the parameters such as the attitude and position of the image plane relative to the screen in response to the action of the player who shoots a specific object in a specific portion. For example, such an interactive game story may be possible that a character in the screen shot without serious damage will respond to shoot against the player along the calculated direction toward the player.

Further according to the present invention, the factor of distance can be introduced into the game story to increase the reality in a three-dimensional virtual reality space. For example, the time taken for the shot bullet to reach a target can be varied in dependence on the distance to each of various targets in the three-dimensional virtual reality space.

It is preferable to utilize the information of the distance from the player to the screen in the present invention.

However, such information may be omitted if the information of the attitude of the player relative to the screen is sufficient for the purpose of representing the game story.

What is claimed is:

1. A game machine comprising:
   a controller of a target, the target including at least four characteristic points on a defined plane;
   an image sensor having an image plane on which an image of including the four characteristic points at a predetermined position of the image plane corresponds to a target point;
   a processor that calculates an attitude of the image plane relative to the defined plane on the basis of the output of the image sensor including the information of the positions of the four characteristic points on the image plane; and
   a signal generator that generates a signal to be transmitted to the controller to cause a change in the target depending on the attitude calculated by the processor.

2. The game machine according to claim 1, wherein the target includes a real object, wherein the controller causes a movement of the real object depending on the attitude calculated by the processor in response to the signal from the signal generator.

3. The game machine according to claim 1, wherein the controller includes an image display that displays an image of the target on a display plane.

4. The game machine according to claim 3, wherein the image display includes an image projector for projecting an image on a screen, the screen corresponding to the display plane.

5. The game machine according to claim 1, further comprising a range finder that measures the distance from the image sensor to the defined plane, wherein the controller causes a change in the image on the display further depending on the range finder.

6. The game machine according to claim 1, wherein the controller causes a movement of the target depending on the attitude calculated by the processor in response to the signal from the signal generator.

7. The game machine according to claim 1, wherein the processor further calculates the position of a target point on the display plane on the basis of the attitude and the output of the image sensor including the information of the positions of the characteristic points and wherein the signal generator generates the signal further depending on the position calculated by the processor.

8. The game machine according to claim 1, wherein the processor includes a first processor for calculating parameters of the attitude on the basis of the positions of the characteristic points on the image plane, and a second processor for calculating position of the target point on the basis of the parameters of the attitude and the positions of the characteristic points on the image plane.

9. A game machine comprising:
   an image display for displaying an image of a target with at least four characteristic points on a display plane;
   an image sensor having an image plane on which an image of the four characteristic points at a predetermined position of the image plane corresponds to a target point;
   a processor for calculating an attitude of the image plane relative to the display plane on the basis of the output of the image sensor including the information of the positions of the four characteristic points on the image plane; and
   a signal generator for generating a signal to be transmitted to the image display to cause a change in the image of the target on the display plane depending on parameters of the attitude calculated by the processor.

10. The game machine according to claim 9, further comprising a range finder that measures the distance from the image plane to the display plane, wherein the signal generator generates the signal further depending on the distance measured by the range finder.

11. The game machine according to claim 9, wherein the processor further calculates the position of a target point on the display plane on the basis of the parameters of the attitude and the output of the image sensor including the information of the positions of the four characteristic points, and wherein the signal generator generates the signal further depending on the position calculated by the processor.

12. The game machine according to claim 9, wherein the processor includes a first processor for calculating the parameters of the attitude on the basis of the positions of the image of the characteristic points on the image plane, and a second processor for calculating the position of the target point on the basis of the parameters of attitude and the positions of the four characteristic points on the image plane.

13. A game machine comprising:
   an image display for displaying an image of a target point on a display plane with at least four characteristic points;
   an image sensor having an image plane on which an image of the four characteristic points at a predetermined position of the image plane corresponds to a target point;
   a processor for calculating the position of a point on the display plane, on the basis of the positions of the four characteristic points on the image plane;
   a comparator for comparing the position of the target point with the position calculated by the processor; and
   a signal generator for generating a signal to be transmitted to the image display to cause a change in the image of the target point on the display plane in response to the comparator.

14. The game machine according to claim 13, wherein the signal generator transmits the signal to cause the change in the image when the comparator finds that the position calculated by the processor is relative to the position of the target.

15. The game machine according to claim 14, further comprising a sighting device for aiming the target point on the display plane.

16. The game machine according to claim 15, wherein the sighting device includes a monitor of field of view given by the image sensor with an indicia positioned at a position in the field of view corresponding to the predetermined position on the image plane.

17. The game machine according to claim 15, wherein the sighting device includes an additional device capable of sighting the image of the target on the display plane with the image sensor not utilized.

18. The game machine according to claim 13, wherein the processor includes a first processor for calculating parameters of attitude on the basis of the positions of the four characteristic points on the image plane, and a second processor for calculating position of the target point on the basis of the parameters of the attitude and the positions of the four characteristic points on the image plane.

19. A game machine comprising:
   an image display for displaying an image of a virtual reality space with at least four characteristic points on a display plane;
   an image sensor having an image plane on which an image of the four characteristic points at a predetermined position of the image plane corresoonds to a target point;

a processor for calculating parameters of an attitude of the image plane relative to the display plane on the basis of the output of the image sensor including the information of the positions of the four characteristic points on the image plane; and a signal generator for generating a signal to be transmitted to the image display to cause a change in the image of the virtual reality space on the display plane depending on the attitude calculated by the processor.

20. The game machine according to claim 19, further comprising a range finder that measures the distance from the image plane to the display plane, wherein the signal generator generates the signal further depending on the distance measured by the range finder.

21. The game machine according to claim 20, wherein the processor further calculates the position of a target point on the display plane, on the basis of the parameters of attitude and the output of the image sensor including the information of the positions of the four characteristic points, and wherein the signal generator generates the signal further depending on the position calculated by the processor.

22. The game machine according to claim 19, wherein the processor includes a first processor for calculating the parameters of the attitude on the basis of the positions of the four characteristic points on the image plane, and a second processor for calculating a position of the target point on the basis of the parameters of the attitude and the positions of the four characteristic points on the image plane.

23. A method of performing a game with a controller of a target, the target including at least four characteristic points and an image sensor having an image plane on which an image of the four characteristic points at a predetermined position of the image plane corresponds to a target point; the method comprising the steps of:

calculating parameters of an attitude of the image plane relative to the display plane on the basis of output of the image sensor including the information of the position of the four characteristic points on the image plane; and generating a signal to be transmitted to the controller to cause a change in the target depending on the attitude calculated by the processor.

24. A computer-readable medium having computer-executable instructions for performing the steps recited in claim 23.

25. A method of performing a game with a an image display for displaying an image of a target with at least four characteristic points and an image sensor having an image plane on which an image of the four characteristic points at a predetermined position of the image plane corresponds to a target point, the method comprising the steps of:

calculating parameters of an attitude of the image plane relative to the display plane on the basis of the output of the image sensor including the information of the positions of the four characteristic points on the image plane; and generating a signal to be transmitted to the image display to cause a change in the image of the target on the display plane depending on the attitude calculated by the processor.

26. A computer-readable medium having computer-executable instructions for performing the steps recited in claim 25.

27. A method of performing a game with a an image display for displaying an image of a target on a display plane with at least four characteristic points and an image sensor having an image plane on which an image of the four characteristic points at a predetermined position of the image plane corresponds to a target point, the method comprising the steps of:

calculating the position of a target point on the display plane, on the basis of the output of the image sensor including the information of the positions of the four characteristic points;

comparing the position of the target point with the position calculated by the processor; and generating a signal to be transmitted to the image display to cause a change in the image of the target on the display plane in response to the comparator.

28. A computer-readable medium having computer-executable instructions for performing the steps recited in claim 27.

29. A method of performing a game with an image display for displaying an image of a virtual reality space with at least four characteristic points and an image sensor having an image plane on which an image of the four characteristic points at a predetermined position of the image plane corresponds to a target point, the method comprising the steps of:

calculating parameters of an attitude of the image plane relative to the display plane on the basis of the output of the image sensor including the information of the positions of the characteristic points on the image plane; and generating a signal to be transmitted to the image display to cause a change in the image of the virtual reality space on the display plane depending on the attitude calculated by the processor.

30. A computer-readable medium having computer-executable instructions for performing the steps recited in claim 29.

* * * * *